US011862085B2

(12) United States Patent
Zhang et al.

(10) Patent No.: US 11,862,085 B2
(45) Date of Patent: Jan. 2, 2024

(54) PIXEL CIRCUIT AND DRIVING METHOD THEREFOR, ARRAY SUBSTRATE AND DISPLAY APPARATUS

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Taoran Zhang, Beijing (CN); Da Zhou, Beijing (CN); Wenjun Liao, Beijing (CN); Zailong Mo, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/641,392

(22) PCT Filed: Jan. 8, 2021

(86) PCT No.: PCT/CN2021/070883
§ 371 (c)(1),
(2) Date: Mar. 8, 2022

(87) PCT Pub. No.: WO2021/139774
PCT Pub. Date: Jul. 15, 2021

(65) Prior Publication Data

US 2022/0301506 A1 Sep. 22, 2022

(30) Foreign Application Priority Data

Jan. 9, 2020 (CN) ......................... 202010022791.3

(51) Int. Cl.
*G09G 3/3233* (2016.01)
*G09G 3/3258* (2016.01)
(Continued)

(52) U.S. Cl.
CPC ........... *G09G 3/3233* (2013.01); *G09G 3/325* (2013.01); *G09G 3/3208* (2013.01);
(Continued)

(58) Field of Classification Search
CPC .... G09G 3/3233; G09G 3/3208; G09G 3/325; G09G 3/3258; G09G 2300/0408;
(Continued)

(56) References Cited

U.S. PATENT DOCUMENTS 10,203,530 B1 2/2019 Xu
10,984,723 B1 * 4/2021 Zhou .................... G09G 3/3258
(Continued)

FOREIGN PATENT DOCUMENTS

CN 103474024 A 12/2013
CN 104167171 A 11/2014
(Continued)

OTHER PUBLICATIONS

The First Office Action for Chinese Patent Application No. 202010022791.3 issued by the Chinese Patent Office dated Sep. 23, 2020.
(Continued)

*Primary Examiner* — Tom V Sheng
(74) *Attorney, Agent, or Firm* — IP & T GROUP LLP

(57) ABSTRACT

A pixel circuit includes sub-pixel circuits each including a reset sub-circuit, a driving sub-circuit, and a light-emitting device. The reset sub-circuit is configured to input a voltage provided by an initial voltage terminal to the driving sub-circuit under control of a signal from a first reset control terminal. The driving sub-circuit is configured to control a
(Continued)

driving current flowing through the light-emitting device according to a data signal output by a data terminal. The sub-pixel circuits include first and second sub-pixel circuits that are located in two adjacent columns, and connected to a same data terminal. A first reset control terminal and a writing control terminal of the first sub-pixel circuit are connected to first and second scanning signal terminals. A first reset control terminal and a writing control terminal of the second sub-pixel circuit are connected to second and third scanning signal terminals.

20 Claims, 26 Drawing Sheets

(51) Int. Cl.
*G09G 3/3208* (2016.01)
*G09G 3/325* (2016.01)

(52) U.S. Cl.
CPC ... *G09G 3/3258* (2013.01); *G09G 2300/0408* (2013.01); *G09G 2300/0426* (2013.01); *G09G 2300/0819* (2013.01); *G09G 2300/0842* (2013.01); *G09G 2300/0861* (2013.01); *G09G 2310/0251* (2013.01); *G09G 2310/061* (2013.01); *G09G 2310/08* (2013.01); *G09G 2320/043* (2013.01); *G09G 2320/045* (2013.01)

(58) Field of Classification Search
CPC ... G09G 2300/0426; G09G 2300/0819; G09G 2300/0842; G09G 2300/0861; G09G 2310/0251; G09G 2310/061; G09G 2310/08; G09G 2320/043; G09G 2320/045
USPC .......................................................... 345/206
See application file for complete search history.

(56) References Cited

U.S. PATENT DOCUMENTS

| | | | | |
|---|---|---|---|---|
| 2006/0139257 | A1* | 6/2006 | Kwak | G09G 3/3233 345/76 |
| 2011/0221791 | A1* | 9/2011 | Kajiyama | G09G 3/3233 345/77 |
| 2011/0292019 | A1* | 12/2011 | Yamamoto | G09G 3/3258 345/211 |
| 2012/0105501 | A1* | 5/2012 | Nakamura | G09G 3/3233 345/77 |
| 2013/0120337 | A1* | 5/2013 | Guo | G09G 3/3208 345/76 |
| 2013/0257839 | A1* | 10/2013 | Hyeon | G09G 3/3258 345/82 |
| 2013/0300724 | A1* | 11/2013 | Chaji | G09G 3/3258 345/212 |
| 2015/0009194 | A1* | 1/2015 | Kim | G09G 3/3233 345/80 |
| 2015/0310805 | A1* | 10/2015 | Hyeon | G09G 3/3258 345/76 |
| 2016/0079330 | A1* | 3/2016 | Oh | H01L 27/124 438/23 |
| 2016/0111484 | A1 | 4/2016 | An et al. | |
| 2016/0155383 | A1 | 6/2016 | Chen | |
| 2016/0163267 | A1 | 6/2016 | Yang | |
| 2016/0203761 | A1* | 7/2016 | Zhang | G09G 3/3233 345/77 |
| 2016/0224157 | A1* | 8/2016 | Yang | G06F 3/042 |
| 2016/0379562 | A1* | 12/2016 | Yoon | G09G 3/3233 345/215 |
| 2017/0221423 | A1 | 8/2017 | Xiang et al. | |
| 2017/0301286 | A1 | 10/2017 | Xiang et al. | |
| 2018/0158410 | A1 | 6/2018 | Jeon | |
| 2018/0182289 | A1* | 6/2018 | Jung | G09G 3/3258 |
| 2018/0261160 | A1 | 9/2018 | Wu et al. | |
| 2018/0342201 | A1 | 11/2018 | Feng | |
| 2019/0025965 | A1* | 1/2019 | Yang | G09G 3/3266 |
| 2019/0123126 | A1* | 4/2019 | Song | H10K 77/111 |
| 2020/0035164 | A1* | 1/2020 | Qing | G09G 3/3266 |
| 2021/0150990 | A1* | 5/2021 | Byun | G09G 3/3233 |
| 2021/0209989 | A1* | 7/2021 | Sung | G09G 3/3233 |
| 2021/0210005 | A1* | 7/2021 | Zhou | G09G 3/325 |
| 2021/0225285 | A1 | 7/2021 | Feng | |
| 2021/0233969 | A1* | 7/2021 | Sun | H10K 59/122 |
| 2021/0358407 | A1* | 11/2021 | Xu | G09G 3/3233 |
| 2022/0084456 | A1* | 3/2022 | Xuan | G09G 3/2092 |
| 2022/0123093 | A1* | 4/2022 | Kim | H10K 59/124 |
| 2022/0328600 | A1* | 10/2022 | Dong | H10K 59/1216 |

FOREIGN PATENT DOCUMENTS

| | | | |
|---|---|---|---|
| CN | 203982749 | U | 12/2014 |
| CN | 105679251 | A | 6/2016 |
| CN | 106023898 | A | 10/2016 |
| CN | 106548752 | A | 3/2017 |
| CN | 106710525 | A | 5/2017 |
| CN | 106991966 | A | 7/2017 |
| CN | 109473061 | A | 3/2019 |
| CN | 110599963 | A | 12/2019 |
| CN | 111063301 | A | 4/2020 |
| KR | 10-2019-0138179 | A | 12/2019 |

OTHER PUBLICATIONS

The Second Office Action for Chinese Patent Application No. 202010022791.3 issued by the Chinese Patent Office dated Mar. 11, 2021.

Decision of Rejection for Chinese Patent Application No. 202010022791.3 issued by the Chinese Patent Office dated Jun. 10, 2021.

* cited by examiner

PIXEL CIRCUIT AND DRIVING METHOD THEREFOR, ARRAY SUBSTRATE AND DISPLAY APPARATUS

CROSS-REFERENCE TO RELATED APPLICATIONS

This application is a national phase entry under 35 USC 371 of International Patent Application No. PCT/CN2021/070883 filed on Jan. 8, 2021, which claims priority to Chinese Patent Application No. 202010022791.3, filed on Jan. 9, 2020, which are incorporated herein by reference in their entirety.

TECHNICAL FIELD

The present disclosure relates to the field of display technologies, and in particular, to a pixel circuit and a driving method therefor, an array substrate, and a display apparatus.

BACKGROUND

An organic light-emitting diode (OLED) display apparatus is one of the hot spots in the current research field, and the OLED has the advantages such as low power consumption, low production cost, self-luminescence, a wide viewing angle, and a high response speed.

SUMMARY

In one aspect, a pixel circuit is provided. The pixel circuit includes a plurality of sub-pixel circuits. Each sub-pixel circuit includes a reset sub-circuit, a driving sub-circuit, and a light-emitting device. The reset sub-circuit is electrically connected to a first reset control terminal, an initial voltage terminal and the driving sub-circuit, and the reset sub-circuit is configured to input a voltage provided by the initial voltage terminal to the driving sub-circuit under control of a signal from the first reset control terminal. The driving sub-circuit is configured to control a driving current flowing through the light-emitting device according to a received data signal output by a data terminal. The plurality of sub-pixel circuits includes a first sub-pixel circuit and a second sub-pixel circuit. The first sub-pixel circuit and the second sub-pixel circuit are located in two adjacent columns, respectively. The first sub-pixel circuit and the second sub-pixel circuit are connected to a same data terminal. A first reset control terminal and a writing control terminal of the first sub-pixel circuit are connected to a first scanning signal terminal and a second scanning signal terminal, respectively. A first reset control terminal and a writing control terminal of the second sub-pixel circuit are sequentially connected to the second scanning signal terminal and a third scanning signal terminal, respectively.

In some embodiments, the plurality of sub-pixel circuits further includes a third sub-pixel circuit. The third sub-pixel circuit and the first sub-pixel circuit are located in two adjacent rows, respectively, and the third sub-pixel circuit and the first sub-pixel circuit are located in a same column and connected to the same data terminal. The third sub-pixel circuit includes a reset sub-circuit and a driving sub-circuit. A first reset control terminal and a writing control terminal of the third sub-pixel circuit are connected to the third scanning signal terminal and a fourth scanning signal terminal, respectively.

In some embodiments, the reset sub-circuit is electrically connected to a second reset control terminal and the light-emitting device. The reset sub-circuit is further configured to input the voltage provided by the initial voltage terminal to the light-emitting device under control of a signal from the second reset control terminal. A second reset control terminal of the first sub-pixel circuit is connected to the third scanning signal terminal; and a second reset control terminal of the second sub-pixel circuit is connected to a fourth scanning signal terminal.

In some embodiments, the reset sub-circuit is electrically connected to a second reset control terminal and the light-emitting device. The reset sub-circuit is further configured to input the voltage provided by the initial voltage terminal to the light-emitting device under control of a signal from the second reset control terminal. A second reset control terminal of the first sub-pixel circuit is connected to the third scanning signal terminal; a second reset control terminal of the second sub-pixel circuit is connected to a fourth scanning signal terminal; and a second reset control terminal of the third sub-pixel circuit is connected to a fifth scanning signal terminal.

In some embodiments, the plurality of sub-pixel circuits further includes a fourth sub-pixel circuit. The fourth sub-pixel circuit and the third sub-pixel circuit are located in a same row, and the fourth sub-pixel circuit and the second sub-pixel circuit are located in a same column and connected to the same data terminal. A first reset control terminal and a writing control terminal of the fourth sub-pixel circuit are connected to the fourth scanning signal terminal and a fifth scanning signal terminal, respectively.

In some embodiments, the reset sub-circuit is electrically connected to a second reset control terminal and the light-emitting device. The reset sub-circuit is further configured to input the voltage provided by the initial voltage terminal to the light-emitting device under control of a signal from the second reset control terminal. A second reset control terminal of the first sub-pixel circuit is connected to the third scanning signal terminal; a second reset control terminal of the second sub-pixel circuit is connected to a fourth scanning signal terminal; a second reset control terminal of the third sub-pixel circuit is connected to a fifth scanning signal terminal; and a second reset control terminal of the fourth sub-pixel circuit is connected to a sixth scanning signal terminal.

In some embodiments, each sub-pixel circuit further includes a writing compensation sub-circuit. The writing compensation sub-circuit is electrically connected to a writing control terminal, the data terminal and the driving sub-circuit. The writing compensation sub-circuit is configured to write the data signal output by the data terminal into the driving sub-circuit under control of a signal from the writing control terminal, so as to compensate for a threshold voltage of the driving sub-circuit.

In some embodiments, the light-emitting device is further electrically connected to a second power supply voltage terminal. Each sub-pixel circuit further includes a light-emitting control sub-circuit. The light-emitting control sub-circuit is electrically connected to an enable terminal, a first power supply voltage terminal, the driving sub-circuit and the light-emitting device. The light-emitting control sub-circuit is configured to close a current path between the first power supply voltage terminal and the second power supply voltage terminal under control of a signal from the enable terminal, so that the driving current is transmitted to the light-emitting device.

In some embodiments, the light-emitting device is further electrically connected to a second power supply voltage terminal. Each sub-pixel circuit further includes a writing compensation sub-circuit and a light-emitting control sub-circuit. The writing compensation sub-circuit is electrically connected to a writing control terminal, the data terminal and the driving sub-circuit. The writing compensation sub-circuit is configured to write the data signal output by the data terminal into the driving sub-circuit under control of a signal from the writing control terminal, so as to compensate for a threshold voltage of the driving sub-circuit. The light-emitting control sub-circuit is electrically connected to an enable terminal, a first power supply voltage terminal, the driving sub-circuit and the light-emitting device. The light-emitting control sub-circuit is configured to close a current path between the first power supply voltage terminal and the second power supply voltage terminal under control of a signal from the enable terminal, so that the driving current is transmitted to the light-emitting device. The driving sub-circuit includes a driving transistor. A gate of the driving transistor is electrically connected to the reset sub-circuit, a first electrode of the driving transistor is electrically connected to the writing compensation sub-circuit, and a second electrode of the driving transistor is electrically connected to the light-emitting control sub-circuit.

In some embodiments, the driving sub-circuit further includes a capacitor. A first end of the capacitor is electrically connected to the gate of the driving transistor, and a second end of the capacitor is electrically connected to the first power supply voltage terminal.

In some embodiments, the reset sub-circuit includes a first transistor and a second transistor. A gate of the first transistor is electrically connected to the first reset control terminal, a first electrode of the first transistor is electrically connected to the initial voltage terminal, and a second electrode of the first transistor is electrically connected to the gate of the driving transistor. A gate of the second transistor is electrically connected to a second reset control terminal, a first electrode of the second transistor is electrically connected to the initial voltage terminal, and a second electrode of the second transistor is electrically connected to the light-emitting device.

In some embodiments, the writing compensation sub-circuit includes a third transistor and a fourth transistor. A gate of the third transistor is electrically connected to the writing control terminal, a first electrode of the third transistor is electrically connected to the gate of the driving transistor, and a second electrode of the third transistor is electrically connected to the second electrode of the driving transistor. A gate of the fourth transistor is electrically connected to the writing control terminal, a first electrode of the fourth transistor is electrically connected to the data terminal, and a second electrode of the fourth transistor is electrically connected to the first electrode of the driving transistor.

In some embodiments, the light-emitting control sub-circuit includes a fifth transistor and a sixth transistor. A gate of the fifth transistor is electrically connected to the enable terminal, a first electrode of the fifth transistor is electrically connected to the second electrode of the driving transistor, and a second electrode of the fifth transistor is electrically connected to the light-emitting device. A gate of the sixth transistor is electrically connected to the enable terminal, a first electrode of the sixth transistor is electrically connected to the first power supply voltage terminal, and a second electrode of the sixth transistor is electrically connected to a first electrode of the driving transistor.

In another aspect, an array substrate is provided. The array substrate includes a substrate, and the pixel circuit as described in any one of the above embodiments and a plurality of data signal lines that are disposed on the substrate. In the plurality of data signal lines, each data signal line is connected to a data terminal, the data signal line is configured to provide a data signal to the data terminal; and every two adjacent columns of sub-pixel circuits share a data signal line of the plurality of data signal lines.

In some embodiments, the array substrate further includes a plurality of first power supply voltage signal lines. The plurality of data signal lines and the plurality of first power supply voltage signal lines are disposed in a same layer and arranged in parallel.

In yet another aspect, a display apparatus is provided. The display apparatus includes the array substrate as described in any one of the above embodiments.

In yet another aspect, a method for driving the pixel circuit as described above is provided. The method includes: in a first scanning period, inputting, by a reset sub-circuit of the first sub-pixel circuit, the voltage provided by the initial voltage terminal to a driving sub-circuit of the first sub-pixel circuit in response to a scanning signal provided by the first scanning signal terminal; in a second scanning period, inputting, by the first sub-pixel circuit, a data signal provided by the same data terminal to the driving sub-circuit of the first sub-pixel circuit in response to a scanning signal provided by the second scanning signal terminal; inputting, by the second sub-pixel circuit, the voltage provided by the initial voltage terminal to a driving sub-circuit of the second sub-pixel circuit in response to the scanning signal provided by the second scanning signal terminal; and in a third scanning period, inputting, by the second sub-pixel circuit, another data signal output by the same data terminal to the driving sub-circuit of the second sub-pixel circuit in response to a scanning signal provided by the third scanning signal terminal.

In some embodiments, the pixel circuit further includes a third sub-pixel circuit. The method further includes: in the third scanning period, inputting, by the third sub-pixel circuit, the voltage provided by the initial voltage terminal to a driving sub-circuit of the third sub-pixel circuit in response to the scanning signal provided by the third scanning signal terminal; and in a fourth scanning period, inputting, by the third sub-pixel circuit, yet another data signal output from the same data terminal to the driving sub-circuit of the third sub-pixel circuit in response to a scanning signal output from a fourth scanning signal terminal.

In some embodiments, the method further includes: in the third scanning period, inputting, by the reset sub-circuit of the first sub-pixel circuit, the voltage provided by the initial voltage terminal to a light-emitting device of the first sub-pixel circuit in response to the scanning signal provided by the third scanning signal terminal; in the fourth scanning period, inputting, by the reset sub-circuit of the second sub-pixel circuit, the voltage provided by the initial voltage terminal to a light-emitting device of the second sub-pixel circuit in response to a scanning signal provided by a fourth scanning signal terminal; and in a case where the pixel circuit further includes a third sub-pixel circuit, in a fifth scanning period, inputting, by a reset sub-circuit of the third sub-pixel circuit, the voltage provided by the initial voltage terminal to a light-emitting device of the third sub-pixel circuit in response to a scanning signal provided by a fifth scanning signal terminal.

In some embodiments, the method further includes: in a light-emitting phase, closing, by a light-emitting control sub-circuit of each sub-pixel circuit, a current path between a first power supply voltage terminal and a second power supply voltage terminal in response to an enable signal provided by an enable terminal, so that a driving current is transmitted to the light-emitting device of the sub-pixel circuit.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1A:
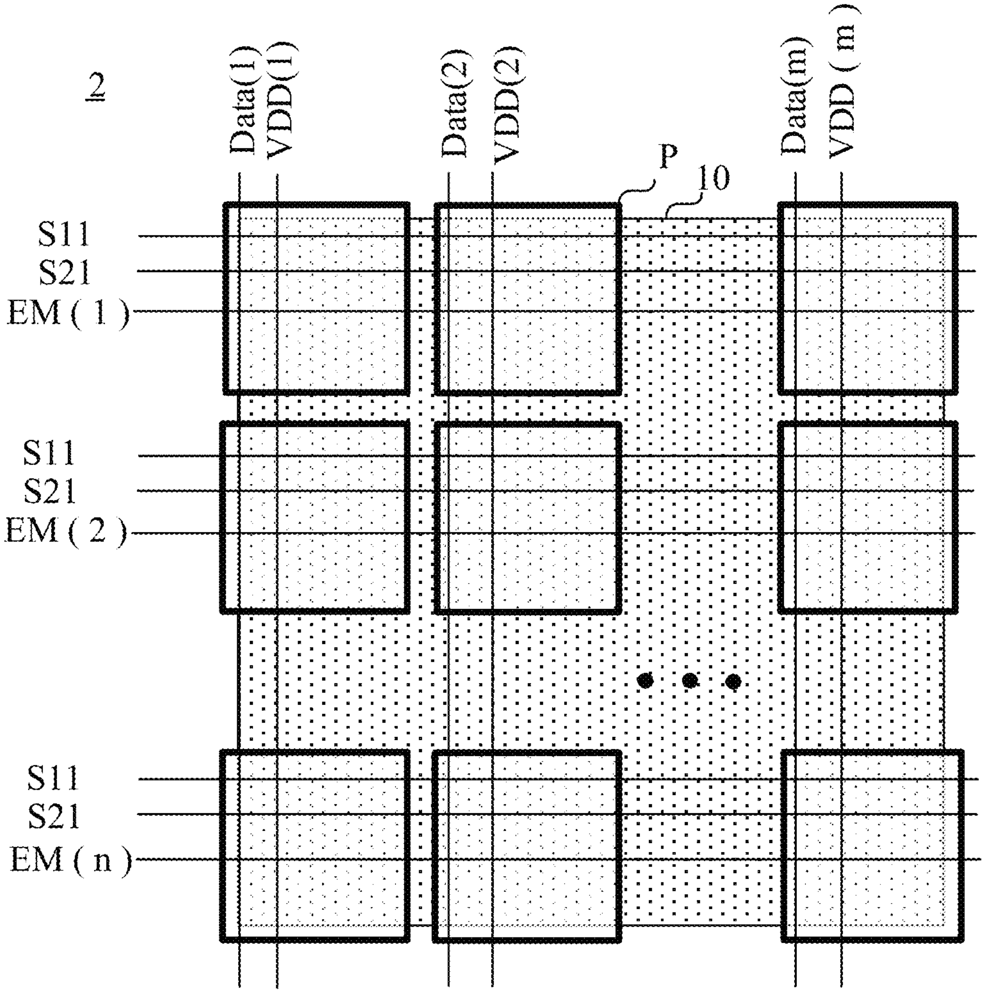
FIG. 1A is a diagram showing a structure of an array substrate.

Technical solutions in some embodiments of the present disclosure will be described clearly and completely below with reference to the accompanying drawings. However, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, terms "first" and "second" are only used for descriptive purposes, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

In the description of some embodiments, the terms "coupled" and "connected" and their extensions may be used. For example, the term "connected" may be used in the description of some embodiments to indicate that two or more components are in direct physical contact or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "A and/or B" includes the following three combinations: only A, only B, and a combination of A and B.

The use of the phrase "applicable to" or "configured to" as used herein indicates an open and inclusive expression, which does not exclude devices that are applicable to or configured to perform additional tasks or steps.

Exemplary embodiments are described herein with reference to cross-sectional views and/or plan views as idealized exemplary drawings. In the accompanying drawings, thickness of layers and regions are enlarged for clarity. Therefore, variations in shape with respect to the drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown in a rectangular shape generally has a curved feature. Therefore, the regions shown in the accompanying drawings are schematic in nature, and their shapes are not intended to show actual shapes of the region in a device, and are not intended to limit the scope of the exemplary embodiments.

In the related art, as shown in FIG. 1A, an array substrate 2 includes a plurality of sub-pixels P. The sub-pixels P may be arranged in an array of n rows and m columns. A sub-pixel circuit of each sub-pixel P is used to drive a light-emitting device to emit light, and the sub-pixel circuit may be, for example, a 7T1C-type sub-pixel circuit.

On this basis, as shown in FIG. 1A, the array substrate 2 further includes: a plurality of pairs of scanning signal lines S11 and S21, a plurality of enable signal lines EM (1) to EM (n), a plurality of data signal lines Data (1) to Data (m), and a plurality of first power supply voltage signal lines VDD (1) to VDD (m).

In some embodiments, the array substrate may further include a plurality of initial voltage signal lines and a plurality of second power supply voltage signal lines.

In this case, a row of sub-pixel circuits are electrically connected to a pair of scanning signal lines, an enable signal line, an initial voltage signal line, and a second power supply voltage signal line.

One scanning signal line of the pair of scanning signal lines is used for providing scanning signals for scanning signal terminals S11 to S1*n*, and the other scanning signal line of the pair of scanning signal lines is used for providing scanning signals for scanning signal terminals S21 to S2*n* (n is an integer greater than or equal to 1). The plurality of enable signal lines EM are used for providing enable signals for enable terminals EM; the plurality of initial voltage signal lines are used for providing an initial voltage signal for initial signal terminals Vinit; the plurality of second power supply voltage signal lines are used for providing a power supply voltage signal to second power supply voltage terminals VSS, thereby providing a scanning signal, an enable signal, the initial voltage signal and the power supply voltage signal to each sub-pixel circuit.

It will be noted that the enable signal line may be understood as a light-emitting signal line, and the enable terminal may be understood as a light-emitting control terminal, in this way, the light-emitting signal line provides a light-emitting signal to the light-emitting control terminal.

A column of sub-pixel circuits are electrically connected to a data signal line and a first power supply voltage signal line.

The data signal lines are used for providing data signals for data terminals Data, and the plurality of first power supply voltage signal lines are used for providing a power supply voltage signal for the power supply voltage terminals VDD, so as to provide a data signal and the power supply voltage signal for each sub-pixel circuit.

Since a distance between the data signal line and the first power supply voltage signal line is insufficient in space wiring, the two signal lines are easily short-circuited, so that a poor X-Bright line happens, which affects the yield.

Figure 1B:
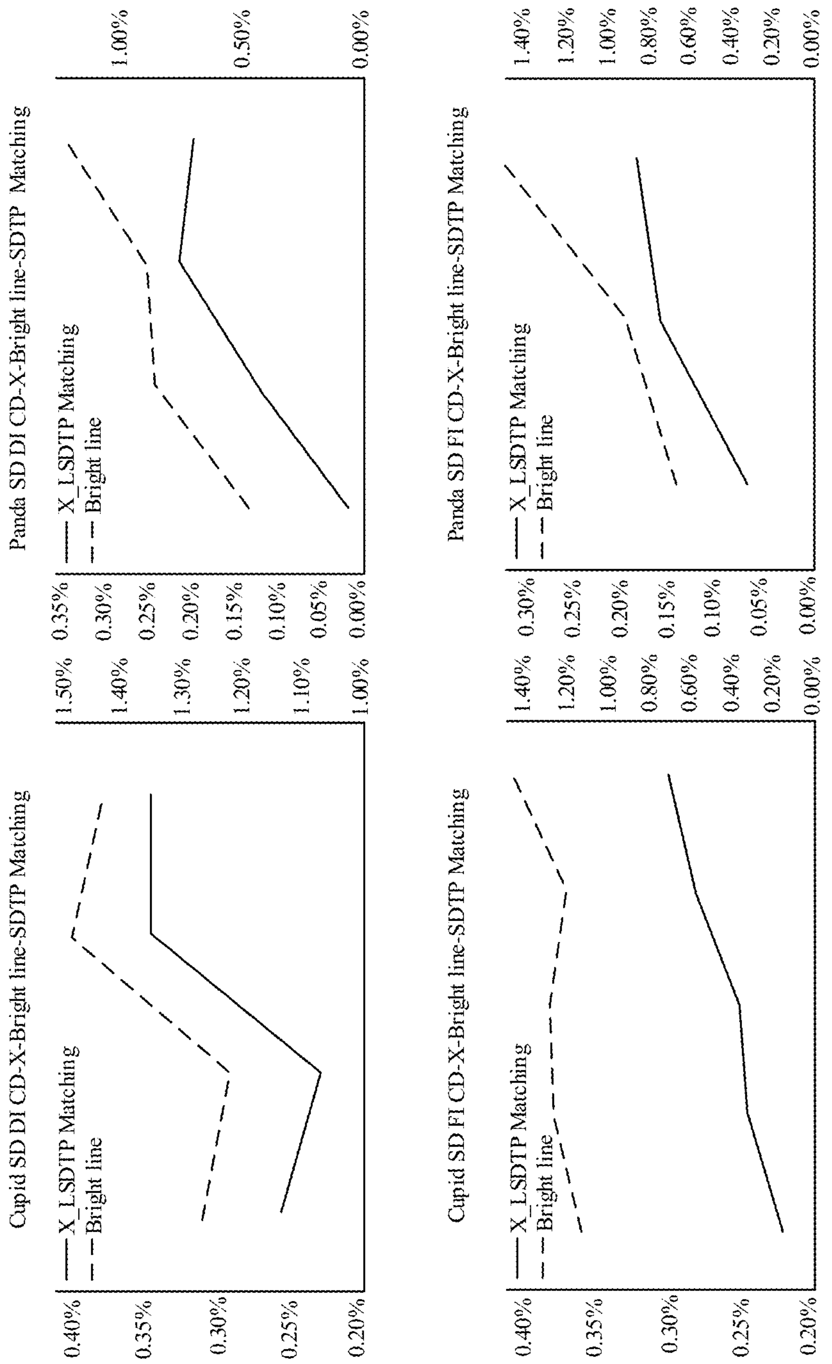
FIG. 1B is a schematic diagram showing an occurrence rate of a poor X-Bright line.

There is a significant linear correlation between the occurrence rate of poor X-Bright line and the distance between the data signal line and the first power supply voltage signal line. For example, as shown in FIG. 1B, considering "Cupid" and "Panda" products as examples, in the source-drain mask (SD Mask) process, in the detection of critical dimension (CD) after development exposure and the detection of final critical dimension, it may be clearly seen that as the critical dimension becomes larger, that is, the distance between the data signal line and the first power supply voltage signal line becomes less, the occurrence rate of X-Bright line will become larger.

Figure 2:
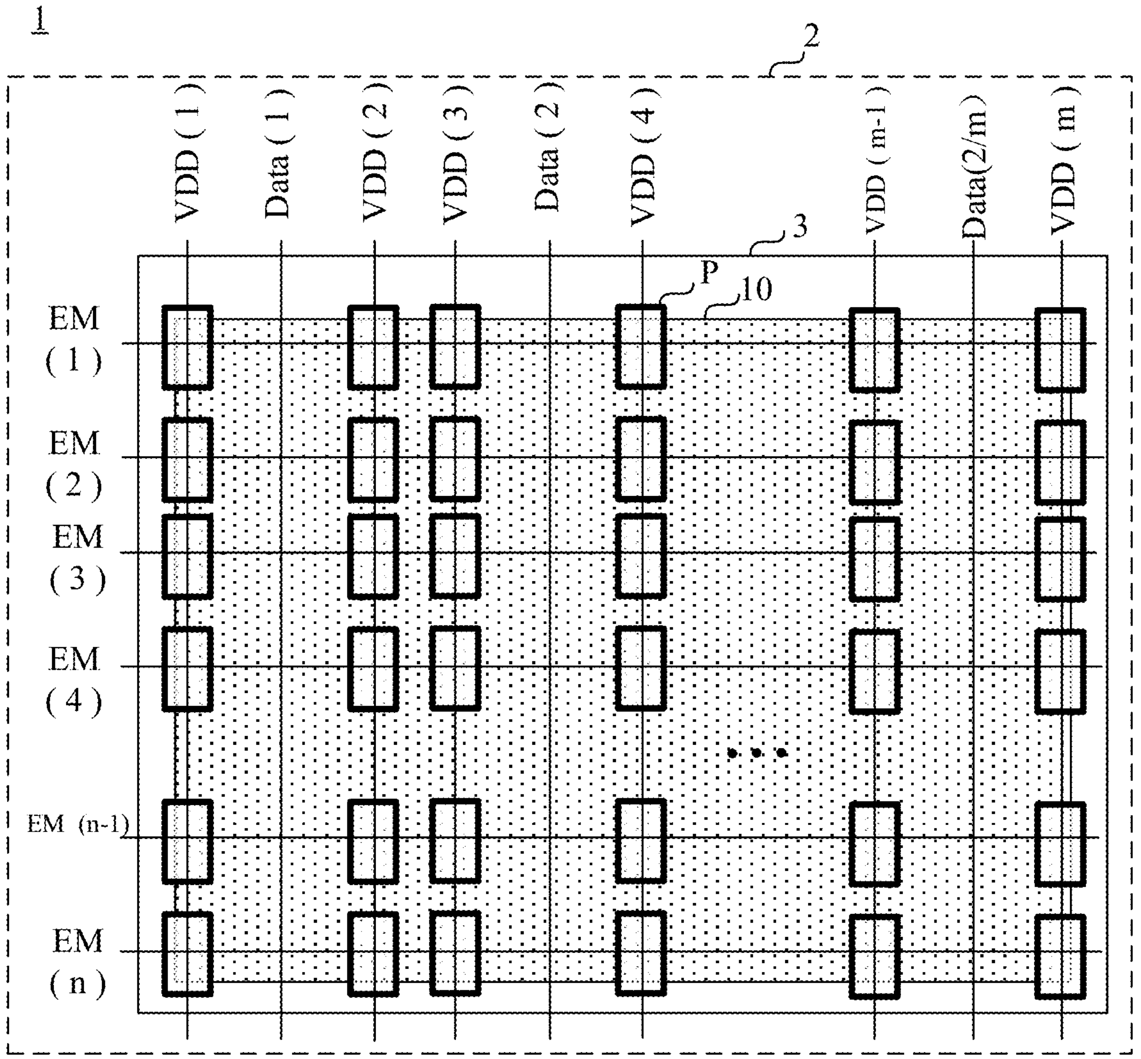
FIG. 2 is a diagram showing a structure of a display apparatus, in accordance with some embodiments of the present disclosure.

In order to solve the above problems, as shown in FIG. 2, some embodiments of the present disclosure provide a display apparatus 1. The display apparatus 1 includes an array substrate 2. The array substrate 2 includes a plurality of pixels P, and a pixel circuit 10, a plurality of data signal lines Data, a plurality of first power supply voltage signal lines VDD, and a plurality of enable signal lines EM that are disposed on a substrate 3.

In some embodiments, the display apparatus may be configured to display an image (i.e., a picture). In this case, the display apparatus may include a display or a product including a display. The display may be a flat panel display (FPD), or a micro display, etc. If classified according to whether users can see scenes on the back of the display, the display may be a transparent display or non-transparent display. If classified according to whether the display may be bent or curled, the display may be a flexible display or a common display (which may be referred to as a rigid display). For example, the product including the display may be a computer display, a television, a billboard, a laser printer with a display function, a telephone, a mobile phone, a personal digital assistant (PDA), a laptop computer, a digital camera, a camcorder, a viewfinder, a vehicle, a large-area wall, a screen in a theater, or a sign in a stadium.

Figure 3A:
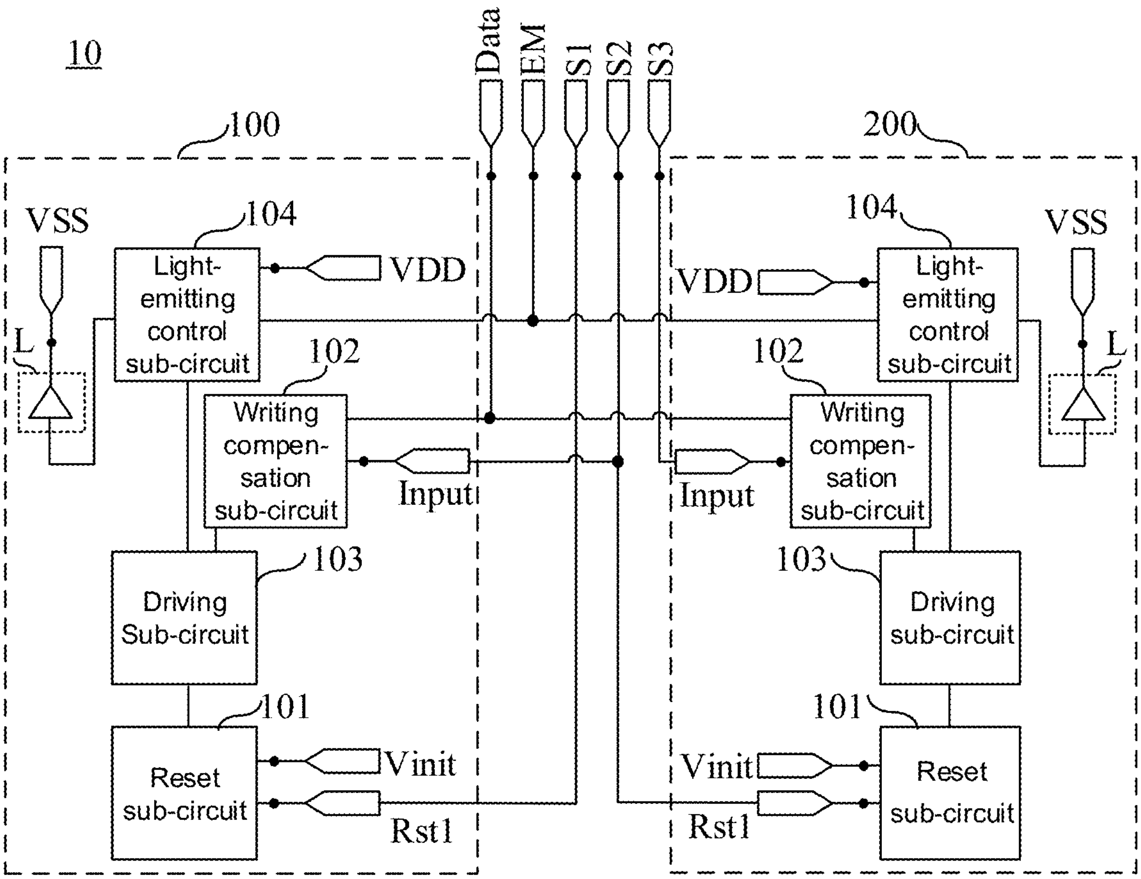
FIG. 3A is a diagram showing a structure of a pixel circuit, in accordance with some embodiments of the present disclosure.

As shown in FIG. 3A, some embodiments of the present disclosure provide a pixel circuit 10. The pixel circuit 10 includes a plurality of sub-pixel circuits. The plurality of sub-pixel circuits include a first sub-pixel circuit 100 and a second sub-pixel circuit 200. The first sub-pixel circuit 100 and the second sub-pixel circuit 200 are located in two adjacent columns, and the first sub-pixel circuit 100 and the second sub-pixel circuit 200 are connected to a same data terminal Data. The first sub-pixel circuit 100 is disposed in a first sub-pixel, and the second sub-pixel circuit 200 is disposed in a second sub-pixel.

In the embodiments, each of the plurality of sub-pixel circuits includes a reset sub-circuit and a driving sub-circuit. For example, as shown in FIG. 3A, both the first sub-pixel circuit 100 and the second sub-pixel circuit 200 include: a reset sub-circuit 101 and a driving sub-circuit 103.

It will be noted that the circuit structures of the first sub-pixel circuit 100 and the second sub-pixel circuit 200 are completely the same.

The reset sub-circuit 101 is electrically connected to a first reset control terminal Rst1, an initial voltage terminal Vinit and the driving sub-circuit 103. The reset sub-circuit 101 is configured to input a voltage provided by the initial voltage terminal Vinit to the driving sub-circuit 103 under control of the first reset control terminal Rst1. That is, the reset sub-circuit 101 is configured to input the voltage provided by the initial voltage terminal Vinit to the driving sub-circuit 103 in response to a reset control signal provided by the first reset control terminal Rst1.

The driving sub-circuit 103 is configured to control a driving current flowing through a light-emitting device according to a received data signal output by a data terminal Data.

It may be understood that for the driving sub-circuit 103 in each sub-pixel circuit, the signal output by the data terminal Data may be the same or different.

In some embodiments, each sub-pixel circuit further includes a writing compensation sub-circuit, a light-emitting control sub-circuit, and the light-emitting device. For example, as shown in FIG. 3A, both the first sub-pixel circuit 100 and the second sub-pixel circuit 200 include a writing compensation sub-circuit 102, a light-emitting control sub-circuit 104, and a light-emitting device L.

In some embodiments, the light-emitting devices L may be current-driven light-emitting devices, such as light-emitting diodes (LEDs), micro light-emitting diodes (Micro LEDs), mini light-emitting diodes (Mini LEDs), or organic light-emitting diodes (OLEDs). The light-emitting devices may also be voltage-driven light-emitting devices, which are not limited in the embodiments.

The writing compensation sub-circuit 102 is electrically connected to a writing control terminal Input, the data terminal Data and the driving sub-circuit 103. The writing compensation sub-circuit 102 is configured to write the data signal output by the data terminal Data into the driving sub-circuit 103 under control of the writing control terminal Input, so as to compensate for a threshold voltage of the driving sub-circuit 103. That is, the writing compensation sub-circuit 102 is configured to write the data signal output by the data terminal Data into the driving sub-circuit 103 in response to a writing control signal provided by the writing control terminal Input, so as to compensate for the threshold voltage of the driving sub-circuit 103.

The light-emitting control sub-circuit 104 is electrically connected to an enable terminal EM, a first power supply voltage terminal VDD, the driving sub-circuit 103, and the light-emitting device L. The light-emitting device L is further electrically connected to a second power supply voltage terminal VSS. The light-emitting control sub-circuit 104 is configured to close a current path between the first power supply voltage terminal VDD and the second power supply voltage terminal VSS under control of the enable terminal EM, so that the driving current is transmitted to the light-emitting device L. That is, the light-emitting control sub-circuit 104 is configured to close the current path between the first power supply voltage terminal VDD and the second power supply voltage terminal VSS in response to an enable signal provided by the enable terminal EM, so that the driving current is transmitted to the light-emitting device L.

It will be noted that the light-emitting control sub-circuit 104 is connected to an anode (positive electrode) of the light-emitting device L, and a cathode (negative electrode) of the light-emitting device L is electrically connected to the second power supply voltage terminal VSS. In this way, when the light-emitting control sub-circuit 104 closes the current path between the first power supply voltage terminal VDD and the second power supply voltage terminal VSS under the control of the enable terminal EM, the driving current is transmitted to the light-emitting device L to drive the light-emitting device L to emit light.

The first power supply voltage terminal VDD may be a high-level terminal and output a constant high voltage; while the second power supply voltage terminal VSS may be a low-level terminal and output a constant low voltage. The terms "high" and "low" here merely indicate a relative magnitude relationship between input voltages. The second power supply voltage terminal VSS may also be grounded.

In the embodiments, as shown in FIG. 3A, a first reset control terminal Rst1 and a writing control terminal Input of the first sub-pixel circuit 100 are connected to a first scanning signal terminal S1 and a second scanning signal terminal S2, respectively.

A first reset control terminal Rst1 and a writing control terminal Input of the second sub-pixel circuit 200 are connected to the second scanning signal terminal S2 and a third scanning signal terminal S3, respectively.

It may be understood that, since the first reset control terminals Rst1 and the writing control terminals Input of the first sub-pixel circuit 100 and the second sub-pixel circuit 200 are sequentially connected to different scanning signal terminals, and in a case where the scanning signal terminals sequentially output scanning signals, the first sub-pixel circuit 100 and the second sub-pixel circuit 200 are both in different states under triggering of any scanning signal.

For example, in a case where the first scanning signal terminal S1, the second scanning signal terminal S2 and the third scanning signal terminal S3 sequentially output scanning signals, the corresponding states of the first sub-pixel circuit 100 and the second sub-pixel circuit 200 are as follows.

When the first scanning signal terminal S1 outputs a scanning signal, the first reset control terminal Rst1 of the first sub-pixel circuit 100 receives the scanning signal of the first scanning signal terminal S1, and inputs the voltage provided by the initial voltage terminal Vinit to the driving sub-circuit 103, so as to reset the driving sub-circuit 103 of the first sub-pixel circuit 100. At this time, the second sub-pixel circuit 200 is not operating.

When the second scanning signal terminal S2 outputs a scanning signal, the first sub-pixel circuit 100 and the second sub-pixel circuit 200 receive the scanning signal of the second scanning signal terminal S2, simultaneously. Although the first sub-pixel circuit 100 and the second sub-pixel circuit 200 operate, simultaneously, since the second scanning signal terminal S2 is electrically connected to the writing control terminal Input of the first sub-pixel circuit 100 and the first reset control terminal Rst1 of the second sub-pixel circuit 200, the writing control terminal Input of the first sub-pixel circuit 100 receives the scanning signal provided by the second scanning signal terminal S2 and writes a data signal output by the data terminal Data into the driving sub-circuit 103, so as to compensate for the threshold voltage of the driving sub-circuit 103; while the driving sub-circuit 103 of the second sub-pixel circuit 200 receives the voltage provided by the initial voltage terminal Vinit to reset the driving sub-circuit 103 of the second sub-pixel circuit 200.

When the third scanning signal terminal S3 outputs a scanning signal, the writing control terminal Input of the second sub-pixel circuit 200 receives the scanning signal provided by the third scanning signal terminal S3, and writes a data signal output by the data terminal Data into the driving sub-circuit 103, so as to compensate for the threshold voltage of the driving sub-circuit 103 of the second sub-pixel circuit 200.

Therefore, the sub-pixel circuits located in two adjacent columns are controlled through different scanning signals, so that the two sub-pixel circuits are written the signals output by the data terminal at different time periods, and the threshold voltages are compensated. Since the writing state occurs at different time, two adjacent sub-pixels may share a single data signal line.

On the basis of the above, sub-pixel circuits located in two adjacent columns are connected to the same data terminal, and the sub-pixel circuits in the two adjacent columns are controlled through different scanning signals, so that the threshold voltages of the sub-pixel circuits in the two adjacent columns may be compensated in different time periods.

Some embodiments of the present disclosure provide the pixel circuit including the first sub-pixel circuit 100 disposed in the first sub-pixel and the second sub-pixel circuit 200 disposed in the second sub-pixel. The first sub-pixel circuit 100 and the second sub-pixel circuit 200 are located in two adjacent columns, and the first sub-pixel circuit 100 and the second sub-pixel circuit 200 are of the same structure. Based on this, the first reset control terminal Rst1 and the writing control terminal Input of the first sub-pixel circuit 100 are connected to the first scanning signal terminal S1 and the second scanning signal terminal S2, respectively, and the first reset control terminal Rst1 and the writing control terminal Input of the second sub-pixel circuit 200 are connected to the second scanning signal terminal S2 and the third scanning signal terminal S3, respectively, so that the first sub-pixel circuit 100 and the second sub-pixel circuit 200 may be turned on in a staggered manner. Signals output by the same data terminal are written in different time periods, thereby achieving that two adjacent sub-pixels share a single data signal line on the basis of achieving the threshold voltage compensation. Since two adjacent columns of sub-pixels may share the single data signal line, the number of data signal lines is reduced, and a purpose of reducing the wiring density of the data signal lines and the first power supply voltage signal lines is achieved. As a result, a risk of X-Bright line is reduced. On the basis that the wiring density is reduced, the critical dimension of the data signal line may be increased appropriately to improve the transmission of the data signal and display effect.

Figure 4A:
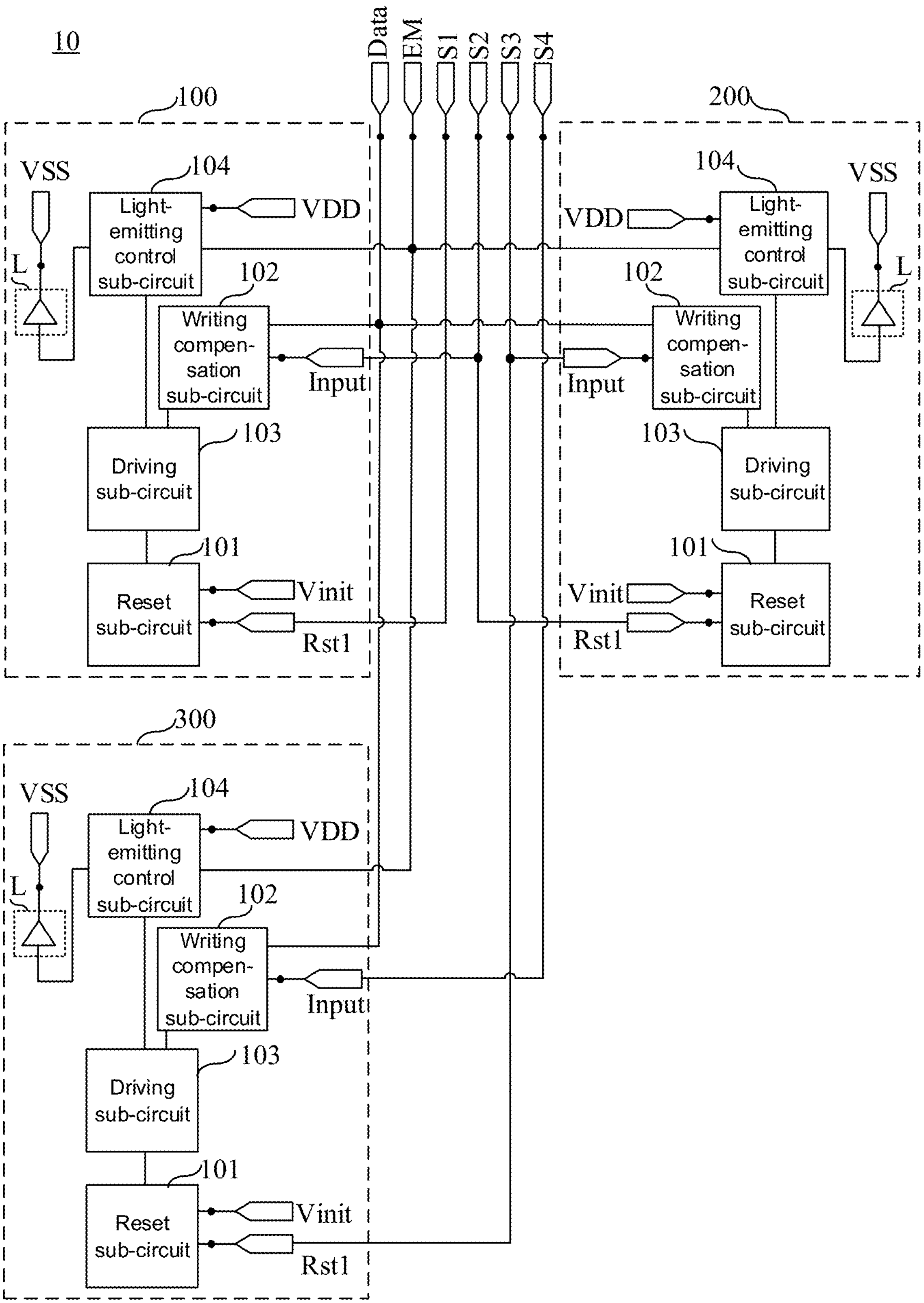
FIG. 4A is a diagram showing a structure of yet another pixel circuit, in accordance with some embodiments of the present disclosure.

In some embodiments, as shown in FIG. 4A, the pixel circuit 10 further includes a third sub-pixel circuit 300. The third sub-pixel circuit 300 and the first sub-pixel circuit 100 are located in two adjacent rows, respectively, and the third sub-pixel circuit 300 and the first sub-pixel circuit 100 are located in a same column and connected to the same data terminal Data.

As shown in FIG. 4A, the third sub-pixel circuit 300 includes: a reset sub-circuit 101, a writing compensation sub-circuit 102, a driving sub-circuit 103, a light-emitting control sub-circuit 104, and a light-emitting device L.

Here, the first sub-pixel circuit 100, the second sub-pixel circuit 200, and the third sub-pixel circuit 300 are of the same circuit structure.

A first reset control terminal Rst1 and a writing control terminal Input of the third sub-pixel circuit 300 are connected to the third scanning signal terminal S3 and a fourth scanning signal terminal S4, respectively.

It may be understood that, since the first reset control terminals Rst1 and the writing control terminals Input of the first sub-pixel circuit 100, the second sub-pixel circuit 200 and the third sub-pixel circuit 300 are sequentially connected to different scanning signal terminals, and in a case where the scanning signal terminals sequentially output scanning signals, the first sub-pixel circuit 100 and each of the second sub-pixel circuit 200 and the third sub-pixel circuit 300 are in different states under the triggering of any scanning signal.

For example, when the first scanning signal terminal S1, the second scanning signal terminal S2, the third scanning signal terminal S3 and the fourth scanning signal terminal S4 sequentially output scanning signals, the corresponding states of the first sub-pixel circuit 100, the second sub-pixel circuit 200 and the third sub-pixel circuit 300 are as follows.

When the first scanning signal terminal S1 outputs a scanning signal, the first reset control terminal Rst1 of the first sub-pixel circuit 100 receives the scanning signal of the first scanning signal terminal S1, and inputs the voltage provided by the initial voltage terminal Vinit to the driving sub-circuit 103, so as to reset the driving sub-circuit 103 of the first sub-pixel circuit 100. At this time, the second sub-pixel circuit 200 and the third sub-pixel circuit 300 are not operating.

When the second scanning signal terminal S2 outputs a scanning signal, the first sub-pixel circuit 100 and the second sub-pixel circuit 200 receive the scanning signal of the second scanning signal terminal S2, simultaneously. Although the first sub-pixel circuit 100 and the second sub-pixel circuit 200 operate, simultaneously, since the second scanning signal terminal S2 is electrically connected to the writing control terminal Input of the first sub-pixel circuit 100 and the first reset control terminal Rst1 of the second sub-pixel circuit 200, the writing control terminal Input of the first sub-pixel circuit 100 receives the scanning signal provided by the second scanning signal terminal S2 and writes a data signal provided by the data terminal Data into the driving sub-circuit 103, so as to compensate for the threshold voltage of the driving sub-circuit 103; while the driving sub-circuit 103 of the second sub-pixel circuit 200 receives the voltage provided by the initial voltage terminal Vinit to reset the driving sub-circuit 103 of the second sub-pixel circuit 200. At this time, the third sub-pixel circuit 300 is not operating.

When the third scanning signal terminal S3 outputs a scanning signal, the second sub-pixel circuit 200 and the third sub-pixel circuit 300 receive the scanning signal of the third scanning signal terminal S3, simultaneously. Although the second sub-pixel circuit 200 and the third sub-pixel circuit 300 operate, simultaneously, since the third scanning signal terminal S3 is electrically connected to the writing control terminal Input of the second sub-pixel circuit 200 and the first reset control terminal Rst1 of the third sub-pixel circuit 300, the writing control terminal Input of the second sub-pixel circuit 200 receives the scanning signal of the third scanning signal terminal S3 and writes a data signal output by the data terminal Data into the driving sub-circuit 103, so as to compensate for the threshold voltage of the driving sub-circuit 103 of the second sub-pixel circuit 200; while the driving sub-circuit 103 of the third sub-pixel circuit 300 receives the voltage provided by the initial voltage terminal Vinit to reset the driving sub-circuit of the third sub-pixel circuit 300.

When the fourth scanning signal terminal S4 outputs a scanning signal, the writing control terminal Input of the third sub-pixel circuit 300 receives the scanning signal provided by the fourth scanning signal terminal S4, and writes a data signal provided by the data terminal Data into the driving sub-circuit 103, so as to compensate for the threshold voltage of the driving sub-circuit 103.

Therefore, three of sub-pixel circuits that are arranged in a 2×2 array may be controlled through different scanning signals, so that the threshold voltages of the three sub-pixel circuits may be compensated at different time periods. Since the writing state occurs at different time, the three sub-pixel circuits may share a single data signal line.

Figure 5A:
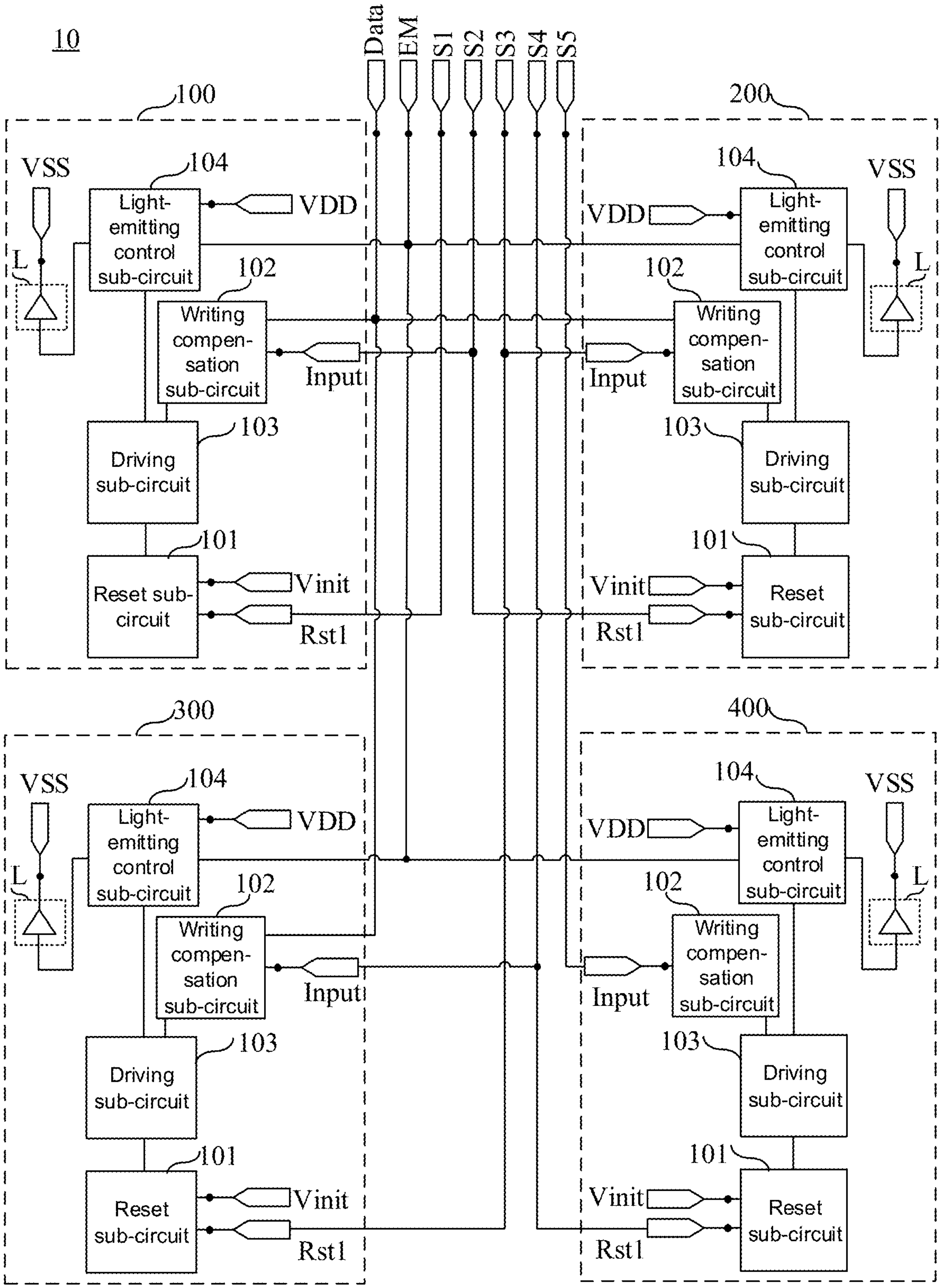
FIG. 5A is a diagram showing a structure of yet another pixel circuit, in accordance with some embodiments of the present disclosure.

Based on the above, as shown in FIG. 5A, the pixel circuit may further includes a fourth sub-pixel circuit 400. The fourth sub-pixel circuit 400 and the first sub-pixel circuit 100 are located in two adjacent rows, respectively. The fourth sub-pixel circuit 400 and the first sub-pixel circuit 100 are located in different columns and connected to the same data terminal. For example, as shown in FIG. 5A, the pixel circuit includes sub-pixel circuits that are arranged in a 2×2 array, and the fourth sub-pixel circuit 400 is of the same structure as other sub-pixel circuits. A first reset control terminal Rst1 and a writing control terminal Input of the fourth sub-pixel circuit 400 are connected to the fourth scanning signal terminal S4 and a fifth scanning signal terminal S5, respectively.

In this case, when the first scanning signal terminal S1, the second scanning signal terminal S2, the third scanning signal terminal S3, the fourth scanning signal terminal S4 and the fifth scanning signal terminal S5 sequentially output scanning signals, the corresponding states of the first sub-pixel circuit 100, the second sub-pixel circuit 200, the third sub-pixel circuit 300 and the fourth sub-pixel circuit 400 are as follows.

When the first scanning signal terminal S1 outputs a scanning signal, the first reset control terminal Rst1 of the first sub-pixel circuit 100 receives the scanning signal of the first scanning signal terminal S1, and inputs the voltage provided by the initial voltage terminal Vinit to the driving sub-circuit 103, so as to reset the driving sub-circuit 103 of the first sub-pixel circuit 100. At this time, the second sub-pixel circuit 200, the third sub-pixel circuit 300 and the fourth sub-pixel circuit 400 are not operating.

When the second scanning signal terminal S2 outputs a scanning signal, the writing control terminal Input of the first sub-pixel circuit 100 receives the scanning signal output by the second scanning signal terminal S2, and writes a data signal output by the data terminal Data into the driving sub-circuit 103, so as to compensate for the threshold voltage of the driving sub-circuit 103 of the first sub-pixel circuit 100; while the first reset control terminal Rst1 of the second sub-pixel circuit 200 receives the scanning signal of the second scanning signal terminal S2, and inputs the voltage provided by the initial voltage terminal Vinit to the driving sub-circuit 103, so as to reset the driving sub-circuit 103 of the second sub-pixel circuit 200. At this time, the third sub-pixel circuit 300 and the fourth sub-pixel circuit 400 are not operating.

When the third scanning signal terminal S3 outputs a scanning signal, the second sub-pixel circuit 200 and the third sub-pixel circuit 300 receive the scanning signal of the third scanning signal terminal S3, simultaneously. Although the second sub-pixel circuit 200 and the third sub-pixel circuit 300 operate, simultaneously, since the third scanning signal terminal S3 is electrically connected to the writing control terminal Input of the second sub-pixel circuit 200 and the first reset control terminal Rst1 of the third sub-pixel circuit 300, the writing control terminal Input of the second sub-pixel circuit 200 receives the scanning signal output by the third scanning signal terminal S3 and writes a data signal provided by the data terminal Data into the driving sub-circuit 103, so as to compensate for the threshold voltage of the driving sub-circuit 103 of the second sub-pixel circuit 200; while the driving sub-circuit 103 of the third sub-pixel circuit 300 receives the voltage provided by the initial voltage terminal Vinit to reset the driving sub-circuit 103 of the third sub-pixel circuit 300.

When the fourth scanning signal terminal S4 outputs a scanning signal, the third sub-pixel circuit 300 and the fourth sub-pixel circuit 400 receive the scanning signal of the fourth scanning signal terminal S4, simultaneously. Although the third sub-pixel circuit 300 and the fourth sub-pixel circuit 400 operate, simultaneously, since the fourth scanning signal terminal S4 is electrically connected to the writing control terminal Input of the third sub-pixel circuit 300 and the first reset control terminal Rst1 of the fourth sub-pixel circuit 400, the writing control terminal Input of the third sub-pixel circuit 300 receives the scanning signal output by the fourth scanning signal terminal S4 and writes a data signal output by the data terminal Data into the driving sub-circuit 103, so as to compensate for the threshold voltage of the driving sub-circuit 103 of the third sub-pixel circuit 300; while the driving sub-circuit 103 of the fourth sub-pixel circuit 400 receives the voltage provided by the initial voltage terminal Vinit to reset the driving sub-circuit 103 of the fourth sub-pixel circuit 400.

When the fifth scanning signal terminal S5 outputs a scanning signal, the writing control terminal Input of the fourth sub-pixel circuit 400 receives the scanning signal output by the fifth scanning signal terminal S5, and writes a data signal output by the data terminal Data into the driving sub-circuit 103, so as to compensate for the threshold voltage of the driving sub-circuit 103 of the fourth sub-pixel circuit 400.

Therefore, the sub-pixel circuits that are arranged in a 2×2 array may be controlled through different scanning signals, so that the four sub-pixel circuits are written the signals output by the data terminal at different time periods to compensate the threshold voltages. Since the writing state occurs at different time, the four sub-pixel circuits may share a single data signal line.

Followed by analogy, a first reset control terminal Rst1 and a writing control terminal Input of every two adjacent columns of sub-pixel circuits are sequentially connected to two adjacent scanning signal terminals in a staggered manner, and the two adjacent columns of sub-pixels may be controlled through different scanning signals, so that the threshold voltages of the two adjacent columns of sub-pixels may be compensated at different time periods, and thus the two adjacent columns of sub-pixels may share a single data signal line.

Figure 6:
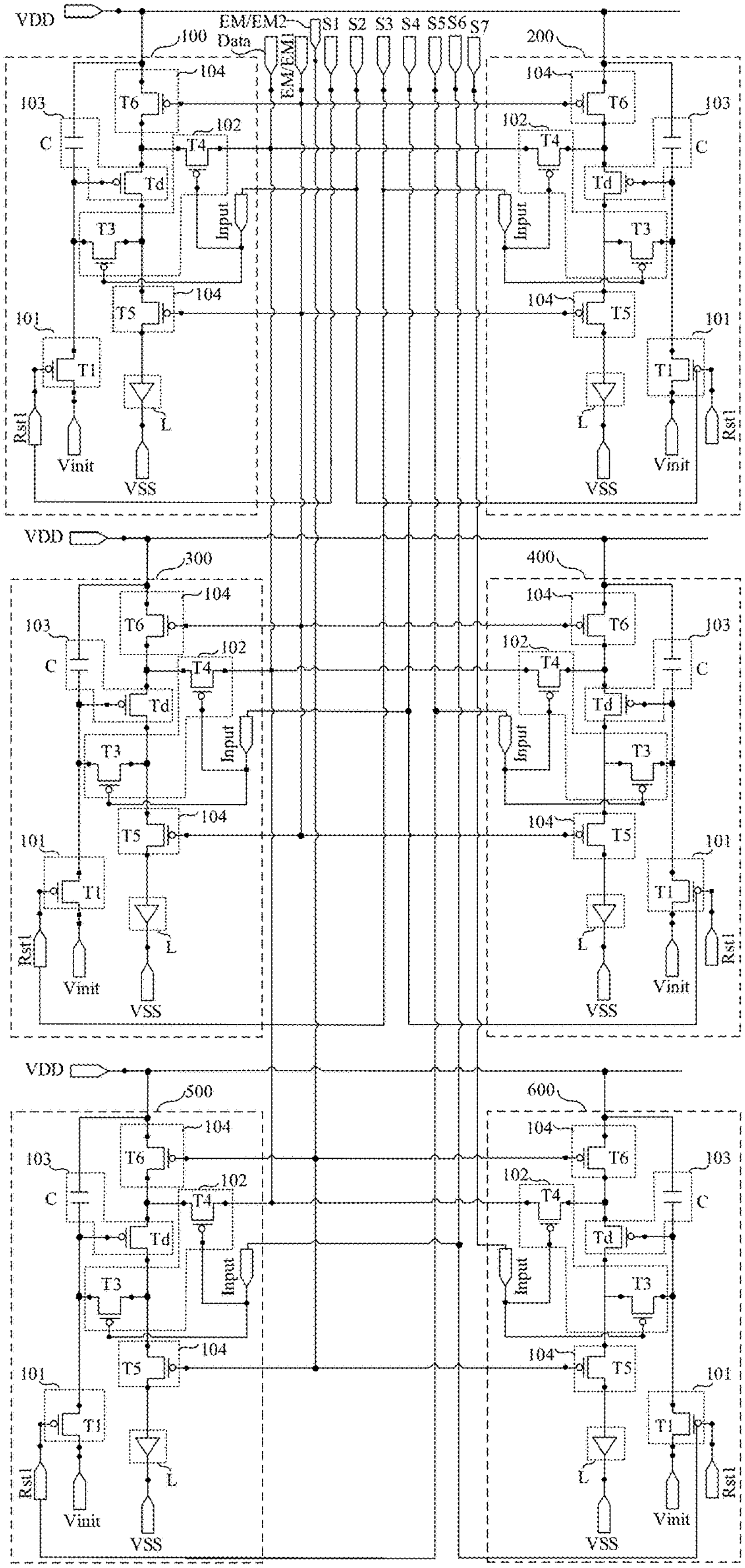
FIG. 6 is a diagram showing structures of sub-pixel circuits of another pixel circuit, in accordance with some embodiments of the present disclosure.

In some embodiments, as shown in FIG. 6, the pixel circuit includes sub-pixel circuits in three rows and two columns. That is, the pixel circuit includes a first sub-pixel circuit 100, a second sub-pixel circuit 200, a third sub-pixel circuit 300, a fourth sub-pixel circuit 400, a fifth sub-pixel circuit 500, and a sixth sub-pixel circuit 600.

Figure 7:
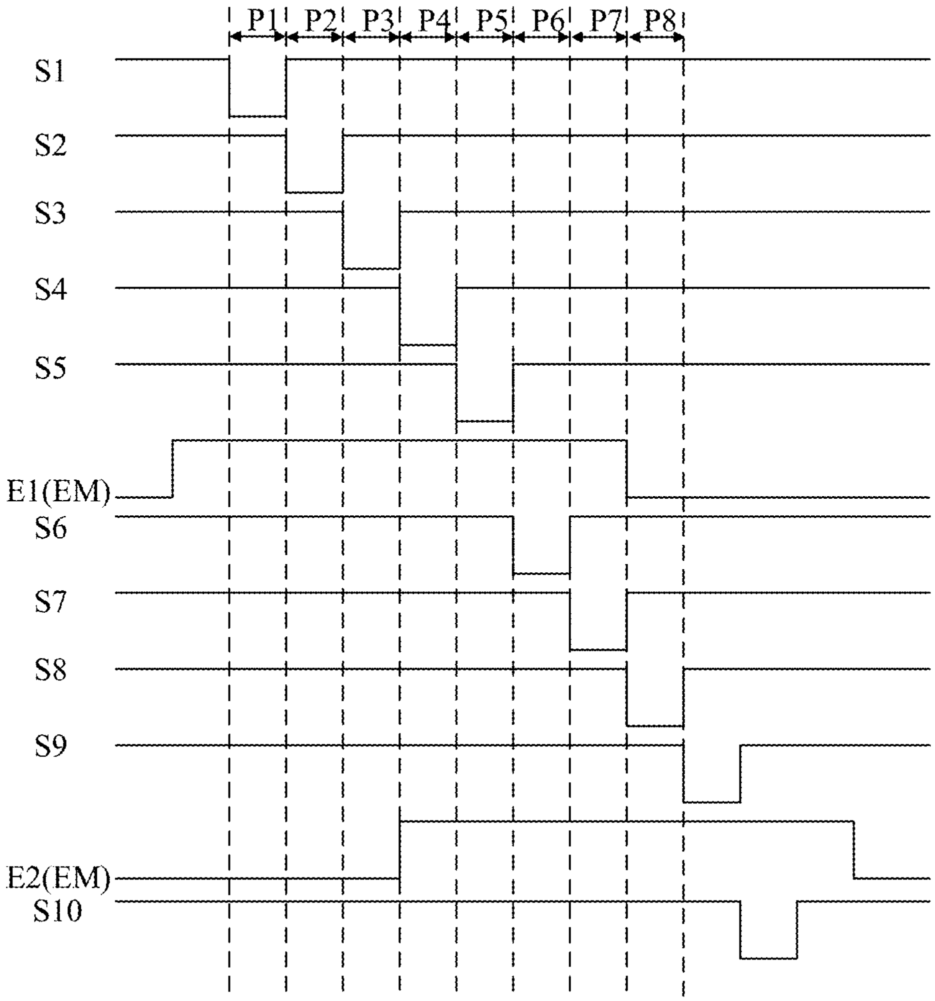
FIG. 7 is a timing circuit diagram of the sub-pixel circuits of the pixel circuit in FIG. 6.

As shown in FIG. 7, if the array substrate includes 2348 rows of pixels and a scanning frequency is 60 Hz, a scanning time of each row is 1/(2348×60) s, i.e., 33333 μs. For a single sub-pixel circuit, its writing compensation time is half of the scanning time, i.e., 16666 μs.

On this basis, an operating principle of the pixel circuit as shown in FIG. 6 will be illustrated in detail in combination with the signal timing diagram as shown in FIG. 7. The operating principle of the pixel circuit may be divided into eight periods, i.e., a first scanning period P1 to an eighth scanning period P8. Each period will be described below.

In the first scanning period P1, as shown in FIG. 7, since the first scanning signal terminal S1 outputs a low-level signal, a first transistor T1 of the first sub-pixel circuit 100 is turned on, and a third transistor T3, a fourth transistor T4, a fifth transistor T5, a sixth transistor T6 and a driving transistor Td of the first sub-pixel circuit 100 are all turned off. At this time, the second sub-pixel circuit 200, the third sub-pixel circuit 300, the fourth sub-pixel circuit 400, the fifth sub-pixel circuit 500, and the sixth sub-pixel circuit 600 are not operating.

The first transistor T1 of the first sub-pixel circuit 100 is turned on, so that the voltage (denoted as V0) provided by the initial voltage terminal Vinit is input to a gate of the driving transistor Td to reset the gate of the driving transistor Td.

In the second scanning period P2, as shown in FIG. 7, since the second scanning signal terminal S2 outputs a low-level signal, the third transistor T3 and the fourth transistor T4 of the first sub-pixel circuit 100 are turned on, the driving transistor Td of the first sub-pixel circuit 100 is turned on, and the first transistor T1, the fifth transistor T5, and the sixth transistor T6 of the first sub-pixel circuit 100 are all turned off. A first transistor T1 of the second sub-pixel circuit 200 is turned on, and a third transistor T3, a fourth transistor T4, a fifth transistor T5, a sixth transistor T6, and a driving transistor Td of the second sub-pixel circuit 200 are all turned off.

Since the third transistor T3 and the fourth transistor T4 of the first sub-pixel circuit 100 are turned on, the data signal (denoted as Vdata1) provided by the data terminal Data may be input to a first electrode of the driving transistor Td, so that Vgs of the drive transistor Td is equal to (V0−Vdata1) (Vgs=V0−Vdata1). In a case where V0 is −3 V, Vgs is less than 0 V, and the driving transistor Td is in an on state. In this case, a gate voltage of the driving transistor Td gradually increases until the gate voltage reaches (Vdata1+Vth) (Vth is the threshold voltage of the driving transistor), thereby achieving the threshold voltage compensation on the driving transistor. Therefore, Vgs of the driving transistor Td is equal to (Vdata1+Vth−Vdata1), i.e., equal to Vth (Vgs=Vdata1+Vth−Vdata1=Vth), so that the driving transistor Td is in an off state.

Since the first transistor T1 of the second sub-pixel circuit 200 is turned on, the voltage (denoted as V0) provided by the initial voltage terminal Vinit may be input to the gate of the driving transistor Td to reset the gate of the driving transistor Td.

In the third scanning period P3, as shown in FIG. 7, since the third scanning signal terminal S3 outputs a low-level signal, the third transistor T3 and the fourth transistor T4 of the second sub-pixel circuit 200 are turned on, the driving transistor Td of the second sub-pixel circuit 200 is turned on, and the first transistor T1, the fifth transistor T5, and the sixth transistor T6 of the second sub-pixel circuit 200 are all turned off. A first transistor T1 of the third sub-pixel circuit 300 is turned on, and a third transistor T3, a fourth transistor T4, a fifth transistor T5, a sixth transistor T6, and a driving transistor Td of the third sub-pixel circuit 300 are all turned off.

Since the third transistor T3 and the fourth transistor T4 of the second sub-pixel circuit 200 are turned on, the data signal provided by the data terminal Data may be input to a first electrode of the driving transistor Td to compensate for the threshold voltage of the driving transistor Td. Moreover, since the first transistor T1 of the third sub-pixel circuit 300 is turned on, the voltage provided by the initial voltage terminal Vinit may be input to a gate of the driving transistor Td to reset the gate of the driving transistor Td.

In the fourth scanning period P4, as shown in FIG. 7, since the fourth scanning signal terminal S4 outputs a low-level signal, the third transistor T3 and the fourth transistor T4 of the third sub-pixel circuit 300 are turned on, the driving transistor Td of the third sub-pixel circuit 300 is turned on, and the first transistor T1, the fifth transistor T5, and the sixth transistor T6 of the third sub-pixel circuit 300 are all turned off. A first transistor T1 of the fourth sub-pixel circuit 400 is turned on, and a third transistor T3, a fourth transistor T4, a fifth transistor T5, a sixth transistor T6, and a driving transistor Td of the fourth sub-pixel circuit 400 are all turned off.

Since the third transistor T3 and the fourth transistor T4 of the third sub-pixel circuit 300 are turned on, the data signal provided by the data terminal Data may be input to a first electrode of the driving transistor Td to compensate for the threshold voltage of the driving transistor Td. Moreover, since the first transistor T1 of the fourth sub-pixel circuit 400 is turned on, the voltage provided by the initial voltage terminal Vinit may be input to a gate of the driving transistor Td to reset the gate of the driving transistor Td.

In the fifth scanning period P5, as shown in FIG. 7, since the fifth scanning signal terminal S5 outputs a low-level signal, the third transistor T3 and the fourth transistor T4 of the fourth sub-pixel circuit 400 are turned on, the driving transistor Td of the fourth sub-pixel circuit 400 is turned on, and the first transistor T1, the fifth transistor T5, and the sixth transistor T6 of the fourth sub-pixel circuit 400 are all turned off. A first transistor T1 of the fifth sub-pixel circuit 500 is turned on, and a third transistor T3, a fourth transistor T4, a fifth transistor T5, a sixth transistor T6, and a driving transistor Td of the fifth sub-pixel circuit 500 are all turned off.

Since the third transistor T3 and the fourth transistor T4 of the fourth sub-pixel circuit 400 are turned on, the data signal output by the data terminal Data may be input to a first electrode of the driving transistor Td to compensate for the threshold voltage of the driving transistor Td. Moreover, since the first transistor T1 of the fifth sub-pixel circuit 500 is turned on, the voltage provided by the initial voltage terminal Vinit may be input to a gate of the driving transistor Td to reset the gate of the driving transistor Td.

In the sixth scanning period P6, as shown in FIG. 7, since the sixth scanning signal terminal S6 outputs a low-level signal, the third transistor T3 and the fourth transistor T4 of the fifth sub-pixel circuit 500 are turned on, the driving transistor Td of the fifth sub-pixel circuit 500 is turned on, and the first transistor T1, the fifth transistor T5, and the sixth transistor T6 of the fifth sub-pixel circuit 500 are all turned off. A first transistor T1 of the sixth sub-pixel circuit 600 is turned on, and a third transistor T3, a fourth transistor T4, a fifth transistor T5, a sixth transistor T6, and a driving transistor Td of the sixth sub-pixel circuit 600 are all turned off.

Since the third transistor T3 and the fourth transistor T4 of the fifth sub-pixel circuit 500 are turned on, the data signal provided by the data terminal Data may be input to a first electrode of the driving transistor Td to compensate for the threshold voltage of the driving transistor Td. Moreover, since the first transistor T1 of the sixth sub-pixel circuit 600 is turned on, the voltage provided by the initial voltage terminal Vinit may be input to a gate of the driving transistor Td to reset the gate of the driving transistor Td.

In the seventh scanning period P7, as shown in FIG. 7, since the seventh scanning signal terminal S7 outputs a low-level signal, the third transistor T3 and the fourth transistor T4 of the sixth sub-pixel circuit 600 are turned on, the driving transistor Td of the six sub-pixel circuit 600 is turned on, and the first transistor T1, the fifth transistor T5, and the sixth transistor T6 of the six sub-pixel circuit 600 are all turned off.

Since the third transistor T3 and the fourth transistor T4 of the sixth sub-pixel circuit 600 are turned on, the data signal provided by the data terminal Data may be input to a first electrode of the driving transistor Td to compensate for the threshold voltage of the driving transistor Td.

In the eighth scanning period P8 (light-emitting phase), as shown in FIG. 7, since the enable terminal EM (E1) outputs a low-level signal, the first sub-pixel circuit 100, the second sub-pixel circuit 200, the third sub-pixel circuit 300 and the fourth sub-pixel circuit 400 each may close the current path between the first power supply voltage terminal and the second power supply voltage terminal in response to the low-level signal (i.e., the enable signal) output by the enable terminal, so that the driving current is transmitted to the light-emitting device. Since the enable terminal EM (E2) outputs a low-level signal, the fifth sub-pixel circuit 500 and the sixth sub-pixel circuit 600 each may close the current path between the first power supply voltage terminal and the second power supply voltage terminal in response to the low-level signal (i.e., the enable signal) output by the enable terminal, so that the driving current is transmitted to the light-emitting device.

It will be noted that a starting time of the light-emitting phase is not limited in this embodiment. For example, as shown in FIG. 7, after the seventh scanning period is completed, that is, after the data signal provided by the data terminal Data may be input to the first electrode of the driving transistor Td of the sixth sub-pixel circuit 600, the light-emitting device in each of the first sub-pixel circuit 100, the second sub-pixel circuit 200, the third sub-pixel circuit 300, and the fourth sub-pixel circuit 400 emit light. In this way, a situation that subsequent timings are staggered may be avoided.

Figure 3B:
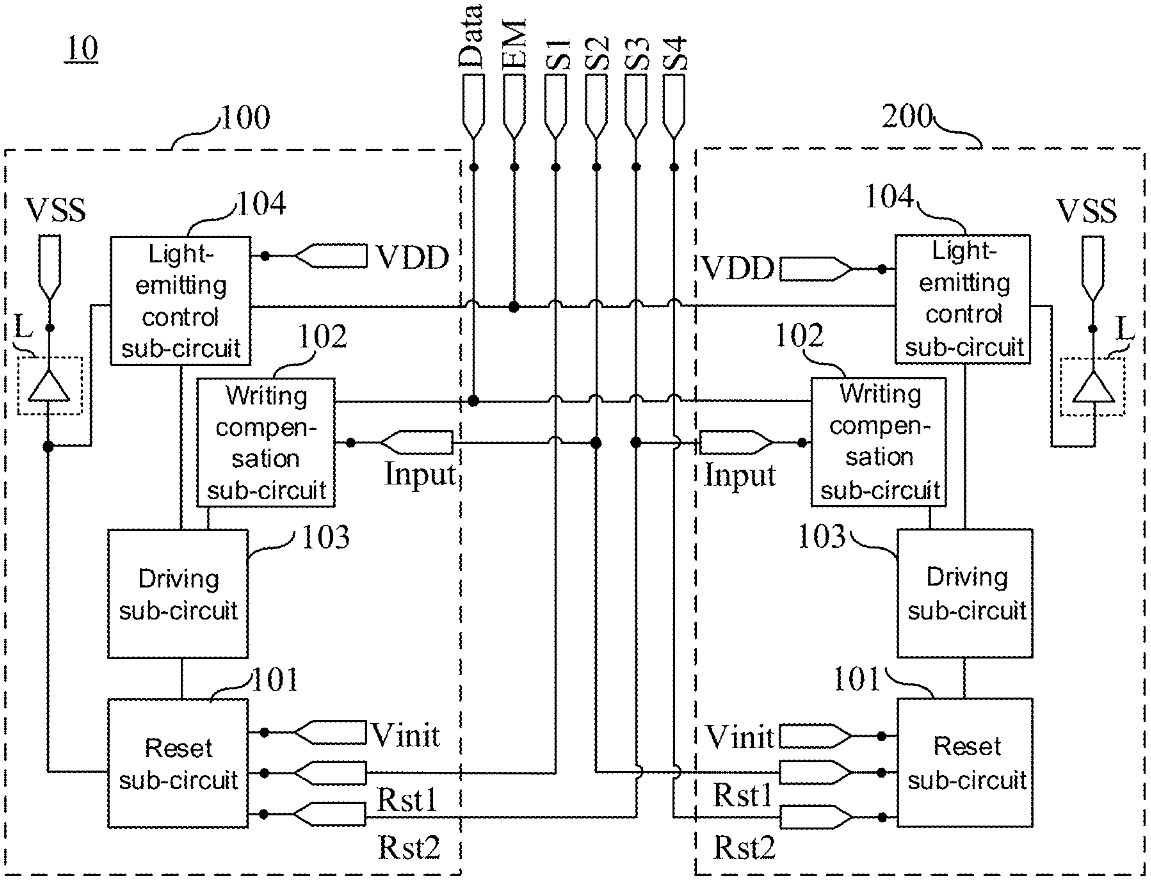
FIG. 3B is a diagram showing a structure of another pixel circuit, in accordance with some embodiments of the present disclosure.
Figure 4B:
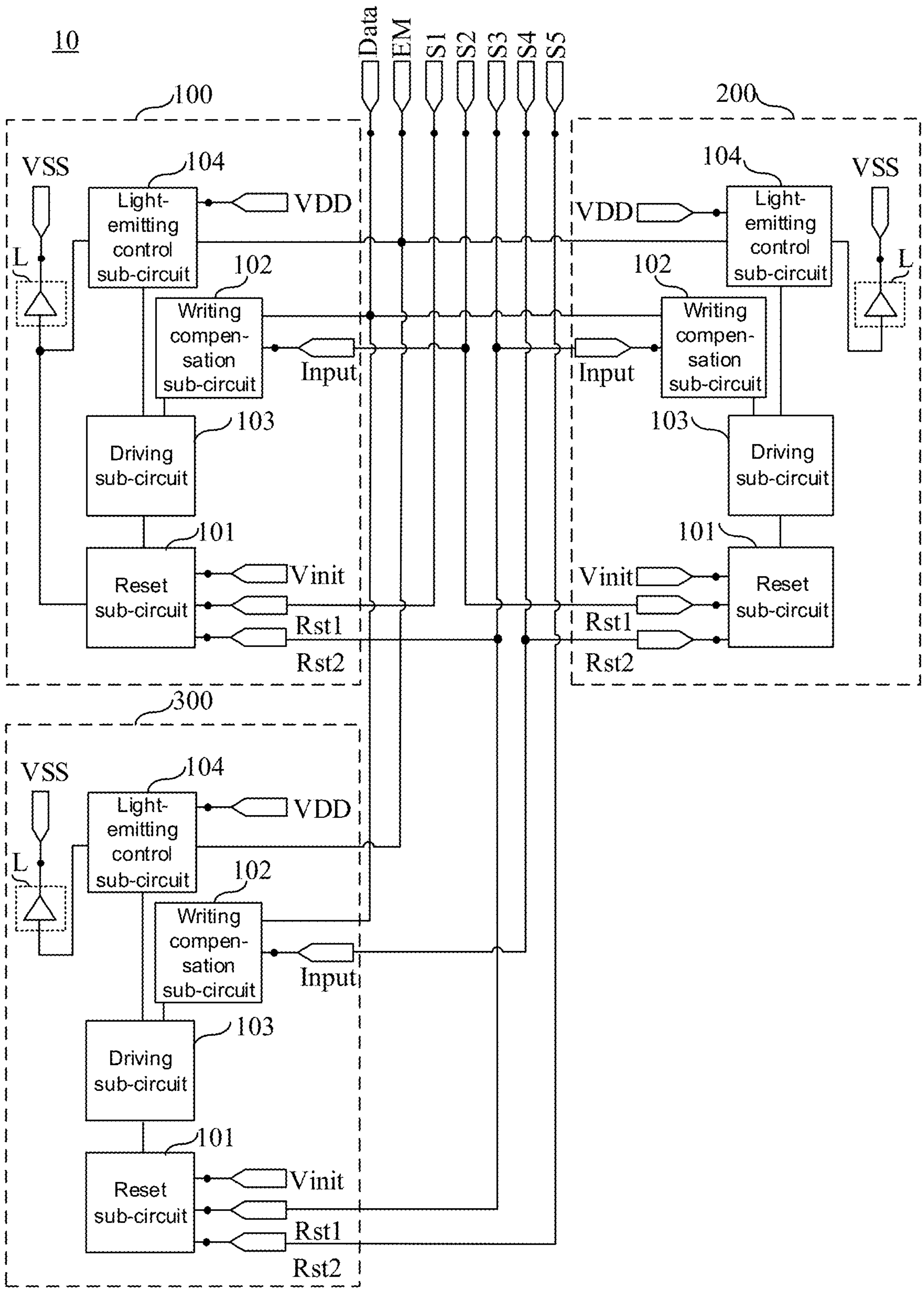
FIG. 4B is a diagram showing a structure of yet another pixel circuit, in accordance with some embodiments of the present disclosure.
Figure 5B:
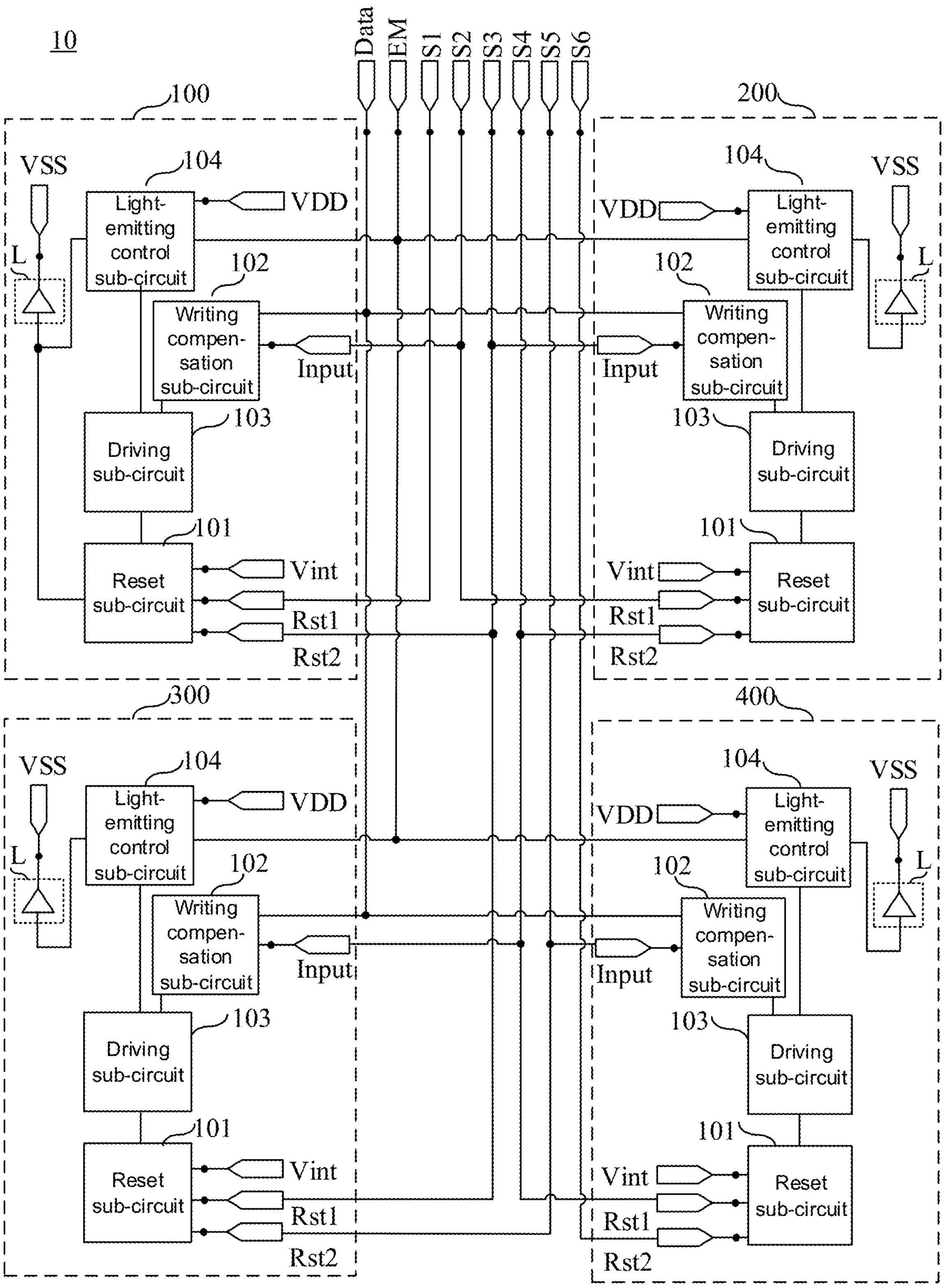
FIG. 5B is a diagram showing a structure of yet another pixel circuit, in accordance with some embodiments of the present disclosure.

In some embodiments, as shown in FIGS. 3B, 4B and 5B, the reset sub-circuit 101 is electrically connected to a second reset control terminal Rst2 and the light-emitting device L.

The reset sub-circuit 101 is further configured to input the voltage provided by the initial voltage terminal Vinit to the light-emitting device L under control of the second reset control terminal Rst2. That is, the reset sub-circuit 101 is further configured to input the voltage provided by the initial voltage terminal Vinit to the light-emitting device L in response to a reset control signal output by the second reset control terminal Rst2.

A second reset control terminal Rst2 of the first sub-pixel circuit 100 is connected to the third scanning signal terminal S3; and a second reset control terminal Rst2 of the second sub-pixel circuit 200 is connected to the fourth scanning signal terminal S4.

It may be understood that, since the second reset control terminals Rst2 of the first sub-pixel circuit 100 and the second sub-pixel circuit 200 are connected to different scanning signal terminals, the first sub-pixel circuit 100 and the second sub-pixel circuit 200 are in different states under triggering of different scanning signals.

For example, in a case where the third scanning signal terminal S3 and the fourth scanning signal terminal S4 output scanning signals at different time, the corresponding states of the first sub-pixel circuit 100, the second sub-pixel circuit 200 and the third sub-pixel circuit 300 are as follows.

When the third scanning signal terminal S3 outputs a scanning signal, the writing control terminal Input of the second sub-pixel circuit 200 receives the scanning signal of the third scanning signal terminal S3, and writes the data signal provided by the data terminal Data into the driving sub-circuit 103 to compensate for the threshold voltage of the driving sub-circuit 103. At this time, the second reset control terminal Rst2 of the first sub-pixel circuit 100 receives the scanning signal of the third scanning signal terminal S3, and inputs the voltage provided by the initial voltage terminal Vinit to the light-emitting device L, so as to reset the anode of the light-emitting device L, thereby forcing a black picture and improving the afterimage.

When the fourth scanning signal terminal S4 outputs a scanning signal, the writing control terminal Input of the third sub-pixel circuit 300 receives the scanning signal output by the fourth scanning signal terminal S4, and writes the data signal output by the data terminal Data into the driving sub-circuit 103 to compensate for the threshold voltage of the driving sub-circuit 103. At this time, the second reset control terminal Rst2 of the second sub-pixel circuit 200 receives the scanning signal of the fourth scanning signal terminal S4, and inputs the voltage provided by the initial voltage terminal Vinit to the light-emitting device L, so as to reset the anode of the light-emitting device L, thereby forcing the black picture and improving the afterimage.

In some embodiments, as shown in FIG. 5B, in a case where the pixel circuit 10 includes the third sub-pixel circuit 300, a second reset control terminal Rst2 of the third sub-pixel circuit 300 is connected to the fifth scanning signal terminal S5.

When the fifth scanning signal terminal S5 outputs a scanning signal, the writing control terminal Input of the fourth sub-pixel circuit 400 receives the scanning signal of the fifth scanning signal terminal S5, and writes the data signal provided by the data terminal Data into the driving sub-circuit 103 to compensate for the threshold voltage of the driving sub-circuit 103. At this time, the second reset control terminal Rst2 of the third sub-pixel circuit 300 receives the scanning signal of the fifth scanning signal terminal S5, and inputs the voltage provided by the initial voltage terminal Vinit to the light-emitting device L, so as to reset the anode of the light-emitting device L, thereby forcing the black picture and improving the afterimage.

Based on the above, as shown in FIG. 5B, in a case where the pixel circuit further includes the fourth sub-pixel circuit 400, a second reset control terminal Rst2 of the fourth sub-pixel circuit 400 is connected to the sixth scanning signal terminal S6. When the sixth scanning signal terminal S6 outputs a scanning signal, the second reset control terminal Rst2 of the fourth sub-pixel circuit 400 receives the scanning signal of the sixth scanning signal terminal S6, and inputs the voltage provided by the initial voltage terminal Vinit to the light-emitting device L, so as to reset the anode of the light-emitting device L, thereby forcing the black picture and improving the afterimage.

Followed by analogy, the first reset control terminal Rst1 and the second reset control terminal Rst2 of every two adjacent columns of sub-pixel circuits are sequentially connected to two adjacent scanning signal terminals, and two adjacent columns of sub-pixels are controlled through different scanning signals, so that the two adjacent columns of sub-pixel circuits may input the voltage provided by the initial voltage terminal Vinit to the light-emitting devices L at different time periods, so as to force the black picture and improve the afterimage.

Figure 3C:
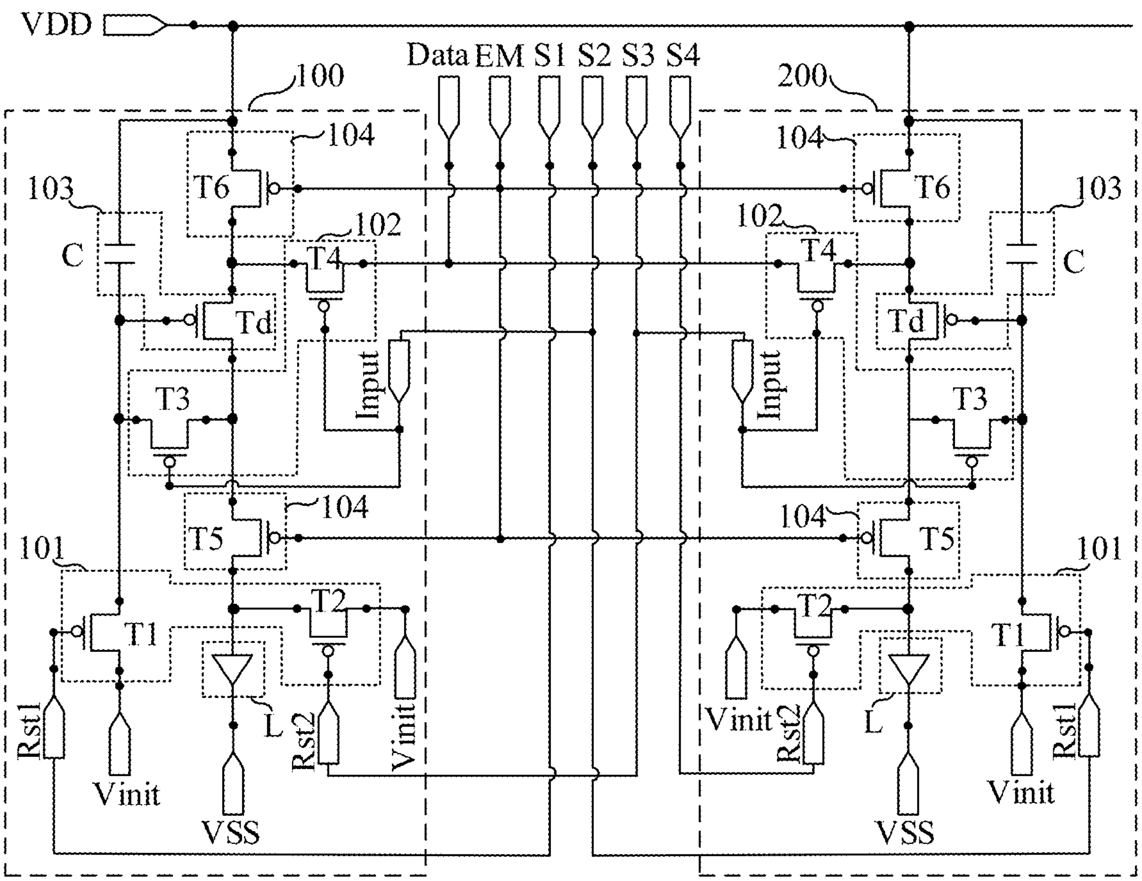
FIG. 3C is a diagram showing structures of sub-pixel circuits of the pixel circuit in FIG. 3B.
Figure 4C:
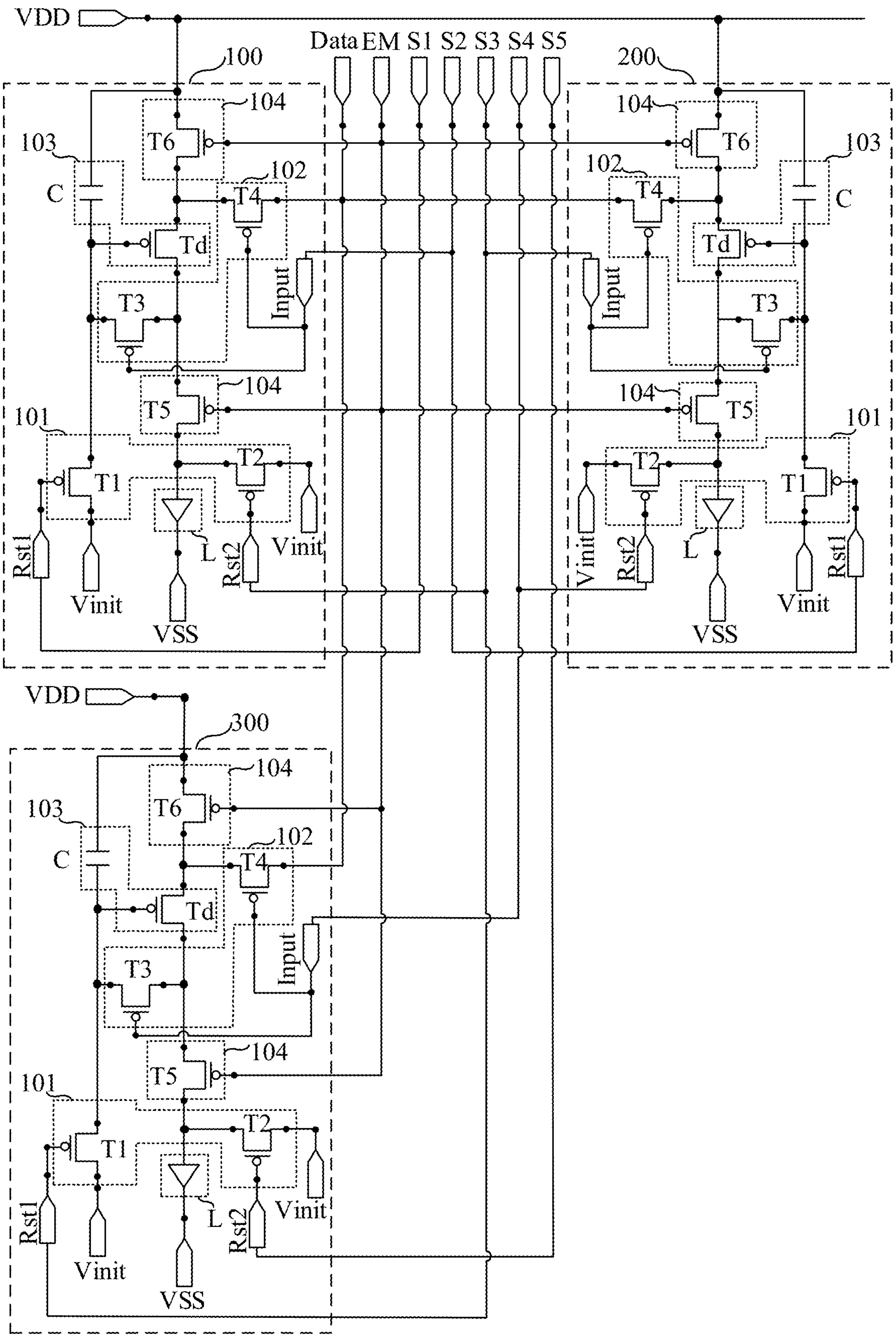
FIG. 4C is a diagram showing structures of sub-pixel circuits of the pixel circuit in FIG. 4B.
Figure 5C:
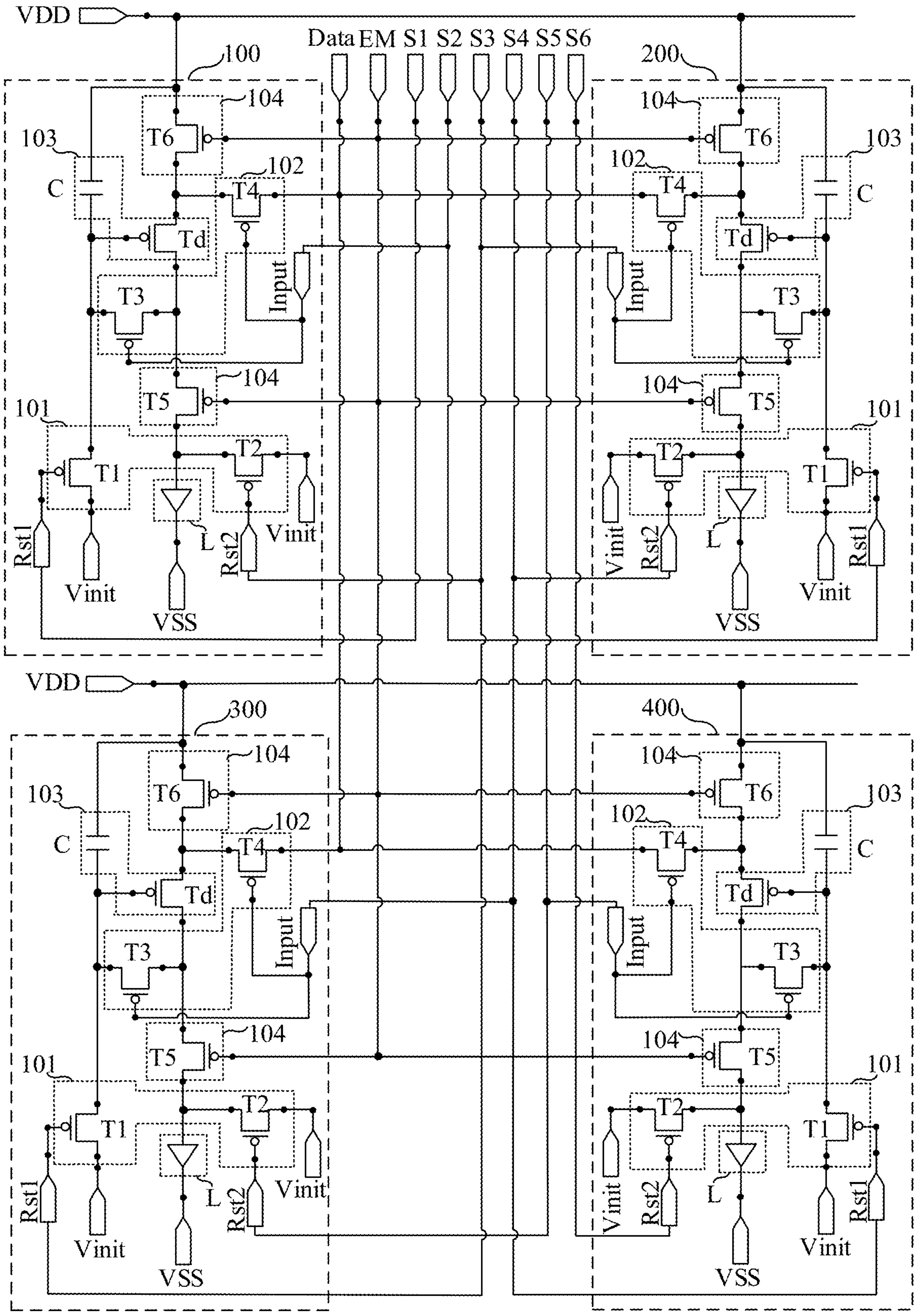
FIG. 5C is a diagram showing structures of sub-pixel circuits of the pixel circuit in FIG. 5B.

In some embodiments, as shown in FIGS. 3C, 4C and 5C, the driving sub-circuit 103 includes a driving transistor Td, and a gate of the driving transistor Td is electrically connected to the reset sub-circuit 101. A first electrode of the driving transistor Td is electrically connected to the writing compensation sub-circuit 102, and a second electrode of the driving transistor Td is electrically connected to the light-emitting control sub-circuit 104.

In some embodiments, as shown in FIGS. 3C, 4C and 5C, in addition to the driving transistor Td, the driving sub-circuit 103 further includes a capacitor C.

A first end of the capacitor C is electrically connected to the gate of the driving transistor Td, and a second end of the capacitor C is electrically connected to the first power supply voltage terminal VDD.

In some embodiments, as shown in FIGS. 3C, 4C and 5C, the reset sub-circuit 101 includes a first transistor T1 and a second transistor T2.

A gate of the first transistor T1 is electrically connected to the first reset control terminal Rst1, a first electrode of the first transistor T1 is electrically connected to the initial voltage terminal Vinit, and a second electrode of the first transistor T1 is electrically connected to the gate of the driving transistor Td.

A gate of the second transistor T2 is electrically connected to the second reset control terminal Rst2, a first electrode of the second transistor T2 is electrically connected to the initial voltage terminal Vinit, and a second electrode of the second transistor T2 is electrically connected to the light-emitting device L.

In a case where the first reset control terminal Rst1 and the second reset control terminal Rst2 are electrically connected to different scanning signal terminals, the first transistor T1 is capable of being turned on or turned off under the control of the first reset control terminal Rst1, and the second transistor T2 is capable of being turned on or turned off under the control of the second reset control terminal Rst2. That is, the first and the second transistors both function as switches.

It will be noted that the reset sub-circuit 101 may further include a plurality of switching transistors connected in parallel with the first transistor T1, and/or a plurality of switching transistors connected in parallel with the second transistor T2. The above is merely an example of the reset sub-circuit 101, other structures with the same function as the reset sub-circuit 101 will not be repeated herein, but all shall be included in the protection scope of the present disclosure.

In some embodiments, as shown in FIGS. 3C, 4C and 5C, the writing compensation sub-circuit 102 includes a third transistor T3 and a fourth transistor T4.

A gate of the third transistor T3 is electrically connected to the writing control terminal Input, a first electrode of the third transistor T3 is electrically connected to the gate of the driving transistor Td, and a second electrode of the third transistor T3 is electrically connected to the second electrode of the driving transistor Td.

A gate of the fourth transistor T4 is electrically connected to the writing control terminal Input, a first electrode of the fourth transistor T4 is electrically connected to the data terminal Data, and a second electrode of the fourth transistor T4 is electrically connected to the first electrode of the driving transistor.

In a case where the writing control terminal Input is electrically connected to a corresponding scanning signal terminal, the third transistor T3 and the fourth transistor T4 both are capable of being turned on or turned off under the control of the writing control terminal Input, and function as switches.

It will be noted that the writing compensation sub-circuit 102 may further include a plurality of switching transistors connected in parallel with the third transistor T3, and/or a plurality of switching transistors connected in parallel with the fourth transistor T4. The above is merely an example of the writing compensation sub-circuit 102, other structures with the same function as the writing compensation sub-circuit 102 will not be repeated herein, but all shall be included in the protection scope of the present disclosure.

In some embodiments, as shown in FIGS. 3C, 4C and 5C, the light-emitting control sub-circuit 104 includes a fifth transistor T5 and a sixth transistor T6.

A gate of the fifth transistor T5 is electrically connected to the enable terminal EM, a first electrode of the fifth transistor T5 is electrically connected to the second electrode of the driving transistor Td, and a second electrode of the fifth transistor T5 is electrically connected to the light-emitting device L.

A gate of the sixth transistor T6 is electrically connected to the enable terminal EM, a first electrode of the sixth transistor T6 is electrically connected to the first power supply voltage terminal VDD, and a second electrode of the sixth transistor T6 is electrically connected to the first electrode of the driving transistor Td.

It will be noted that the light-emitting control sub-circuit 104 may further include a plurality of switching transistors connected in parallel with the fifth transistor T5, and/or a plurality of switching transistors connected in parallel with the sixth transistor T6. The above is merely an example of the light-emitting control sub-circuit 104. Other structures having the same function as the light-emitting control sub-circuit 104 will not be repeated herein, but all shall be included in the protection scope of the present disclosure.

Based on the above description of each sub-pixel circuit, a specific driving process of the above pixel circuit will be described in detail with reference to FIG. 5C. First transistors T1, second transistors T2, third transistors T3, fourth transistors T4, fifth transistors T5, sixth transistors T6 and driving transistors Td of the first sub-pixel circuit 100, the second sub-pixel circuit 200, the third sub-pixel circuit 300 and the fourth sub-pixel circuit 400 are all P-type transistors.

Figure 8A:
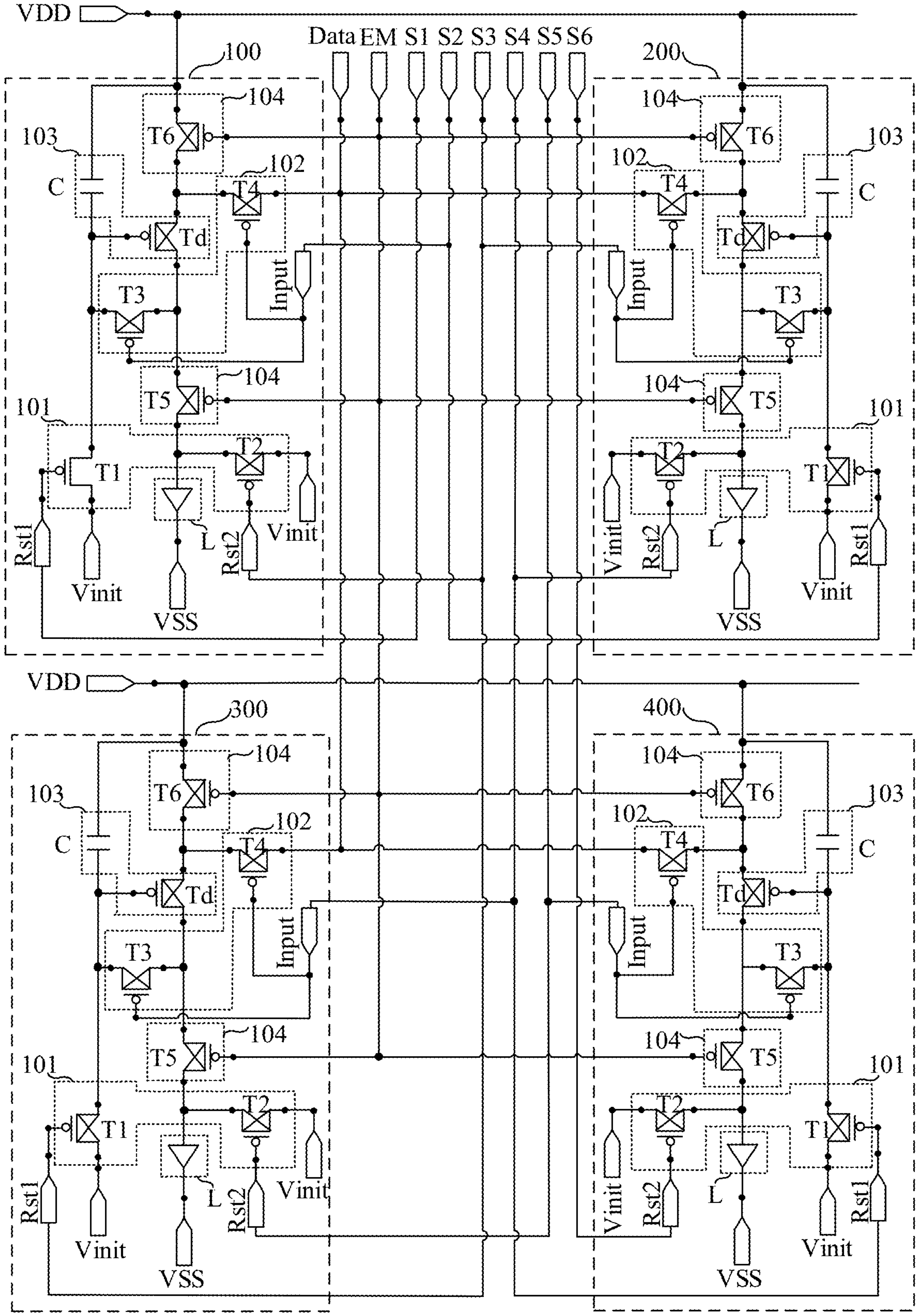
FIGS. 8A to 8G are equivalent circuit diagrams of the pixel circuit in FIG. 5C during periods.

In the first scanning period P1, the first scanning signal terminal S1 outputs a low-level signal, the second scanning signal terminal S2, the third scanning signal terminal S3, the fourth scanning signal terminal S4, the fifth scanning signal terminal S5 and the sixth scanning signal terminal S6 all output high-level signals, and the enable terminal EM outputs a high-level signal. Based on this, an equivalent circuit diagram of the pixel circuit as shown in FIG. 5C is shown in FIG. 8A.

The first transistor T1 of the first sub-pixel circuit 100 is turned on, and the second transistor T2, the third transistor T3, the fourth transistor T4, the fifth transistor T5, the sixth transistor T6, and the driving transistor Td of the first sub-pixel circuit 100 are all turned off.

A first transistor T1 of the first sub-pixel circuit 100 is turned on, so that the voltage (denoted as V0) of the initial voltage terminal Vinit is input to a gate of the driving transistor Td to reset the gate of the driving transistor Td.

Figure 8B:
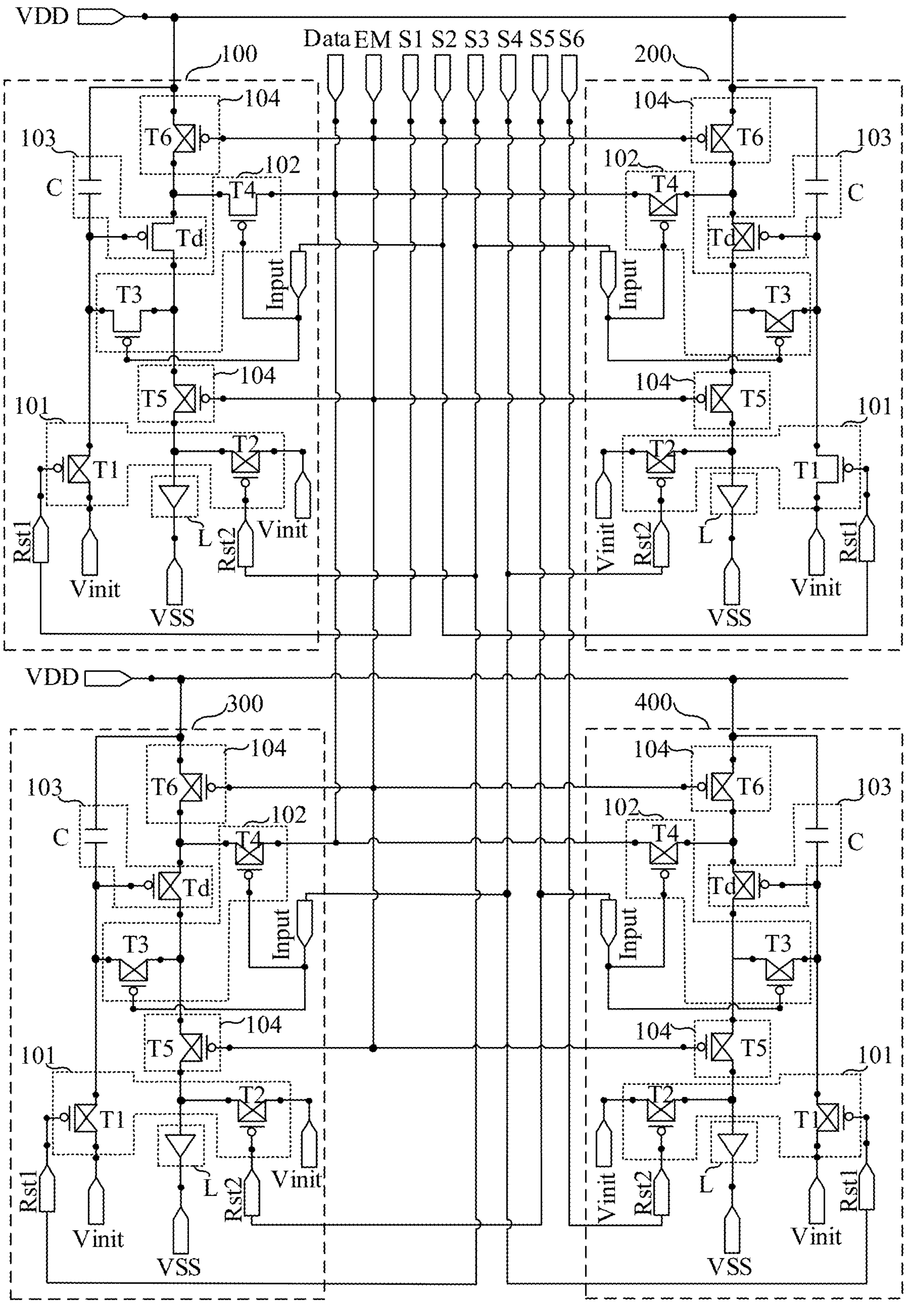

In the second scanning period P2, the second scanning signal terminal S2 outputs a low-level signal, the first scanning signal terminal S1, the third scanning signal terminal S3, the fourth scanning signal terminal S4, the fifth scanning signal terminal S5 and the sixth scanning signal terminal S6 all output high-level signals, and the enable terminal EM outputs the high-level signal. Based on this, an equivalent circuit diagram of the pixel circuit shown in FIG. 5C is shown in FIG. 8B.

The third transistor T3 and the fourth transistor T4 of the first sub-pixel circuit 100 are turned on, and the driving transistor Td of the first sub-pixel circuit 100 is turned on, and the first transistor T1, the second transistor T2, the fifth transistor T5 and the sixth transistor T6 of the first sub-pixel circuit 100 are all turned off.

Since the third transistor T3 and the fourth transistor T4 of the first sub-pixel circuit 100 are turned on, the data signal (denoted as Vdata1) output by the data terminal Data is written into a first electrode of the driving transistor Td, so that Vgs of the driving transistor Td is equal to (V0−Vdata1) (Vgs=V0−Vdata1). In a case where V0 is −3 V, Vgs is less than 0 V, and the driving transistor Td is in an on state. In this case, a gate voltage of the driving transistor Td gradually increases until the gate voltage reaches (Vdata1+Vth) (Vth is the threshold voltage of the driving transistor), so as to achieve the threshold voltage compensation on the driving transistor. Therefore, Vgs of the driving transistor Td is equal to (Vdata1+Vth−Vdata1), i.e., equal to Vth (Vgs=Vdata1+Vth−Vdata1=Vth), so that the driving transistor Td is in an off state.

The first transistor T1 of the second sub-pixel circuit 200 is turned on, and the second transistor T2, the third transistor T3, the fourth transistor T4, the fifth transistor T5, the sixth transistor T6, and the driving transistor Td of the second sub-pixel circuit 200 are all turned off.

A first transistor T1 of the second sub-pixel circuit 200 is turned on, so that the voltage (denoted as V0) of the initial voltage terminal Vinit is input to a gate of the driving transistor Td to reset the gate of the driving transistor Td.

Figure 8C:
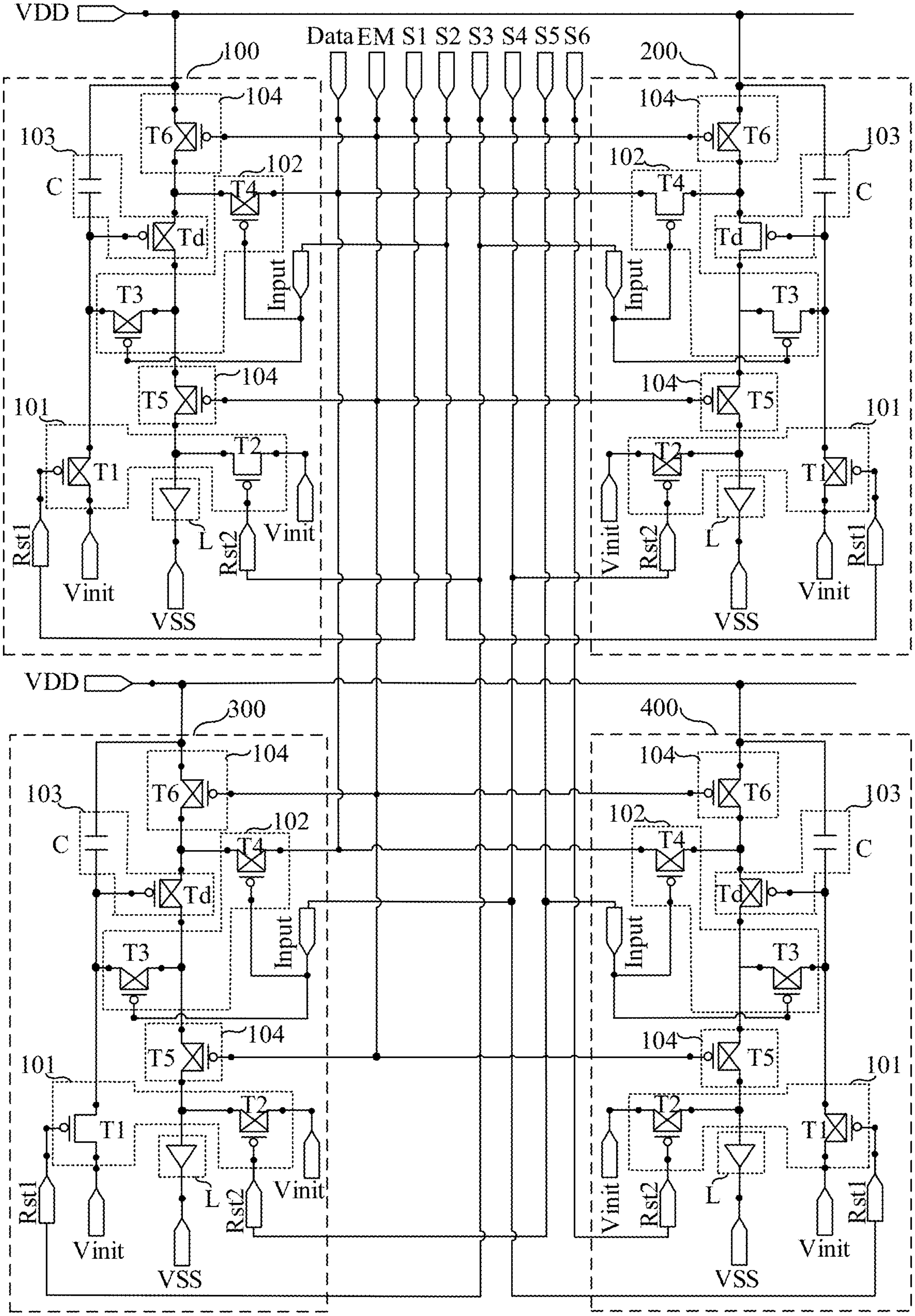

In the third scanning period P3, the third scanning signal terminal S3 outputs a low-level signal, the first scanning signal terminal S1, the second scanning signal terminal S2, the fourth scanning signal terminal S4, the fifth scanning signal terminal S5 and the sixth scanning signal terminal S6 all output high-level signals, and the enable terminal EM outputs the high-level signal. Based on this, an equivalent circuit diagram of the pixel circuit shown in FIG. 5C is shown in FIG. 8C.

The second transistor T2 of the first sub-pixel circuit 100 is turned on, and the first transistor T1, the third transistor T3, the fourth transistor T4, the fifth transistor T5, and the sixth transistor T6 of the first sub-pixel circuit 100 are all turned off.

A capacitor of the first sub-pixel circuit 100 keeps the gate voltage of the driving transistor Td at (Vdata1+Vth), and the second transistor T2 of the first sub-pixel circuit 100 is turned on, so that the voltage provided by the initial voltage terminal Vinit is input to an anode of a light-emitting device L to force the black picture and improve the afterimage.

The third transistor T3 and the fourth transistor T4 of the second sub-pixel circuit 200 are turned on, and the driving transistor Td of the second sub-pixel circuit 200 is turned on, and the first transistor T1, the second transistor T2, the fifth transistor T5 and the sixth transistor T6 of the second sub-pixel circuit 200 are all turned off.

Since the third transistor T3 and the fourth transistor T4 of the second sub-pixel circuit 200 are turned on, the data signal (denoted as Vdata2) output by the data terminal Data is written into a first electrode of the driving transistor Td, so that Vgs of the driving transistor Td is equal to (V0−Vdata2) (Vgs=V0−Vdata2). In a case where V0 is −3 V, Vgs is less than 0 V, and the driving transistor Td is in an on state. In this case, a gate voltage of the driving transistor Td gradually increases until the gate voltage reaches (Vdata2+Vth), so as to achieve the threshold voltage compensation on the driving transistor. Therefore, Vgs of the driving transistor Td is equal to (Vdata2+Vth−Vdata2), i.e., equal to Vth (Vgs=Vdata2+Vth−Vdata2=Vth), so that the driving transistor Td is in an off state.

The first transistor T1 of the third sub-pixel circuit 300 is turned on, and the second transistor T2, the third transistor T3, the fourth transistor T4, the fifth transistor T5, the sixth transistor T6, and the driving transistor Td of the third sub-pixel circuit 300 are all turned off.

The first transistor T1 of the third sub-pixel circuit 300 is turned on, so that the voltage (denoted as V0) of the initial voltage terminal Vinit is input to a gate of the driving transistor Td to reset the gate of the driving transistor Td.

Figure 8D:
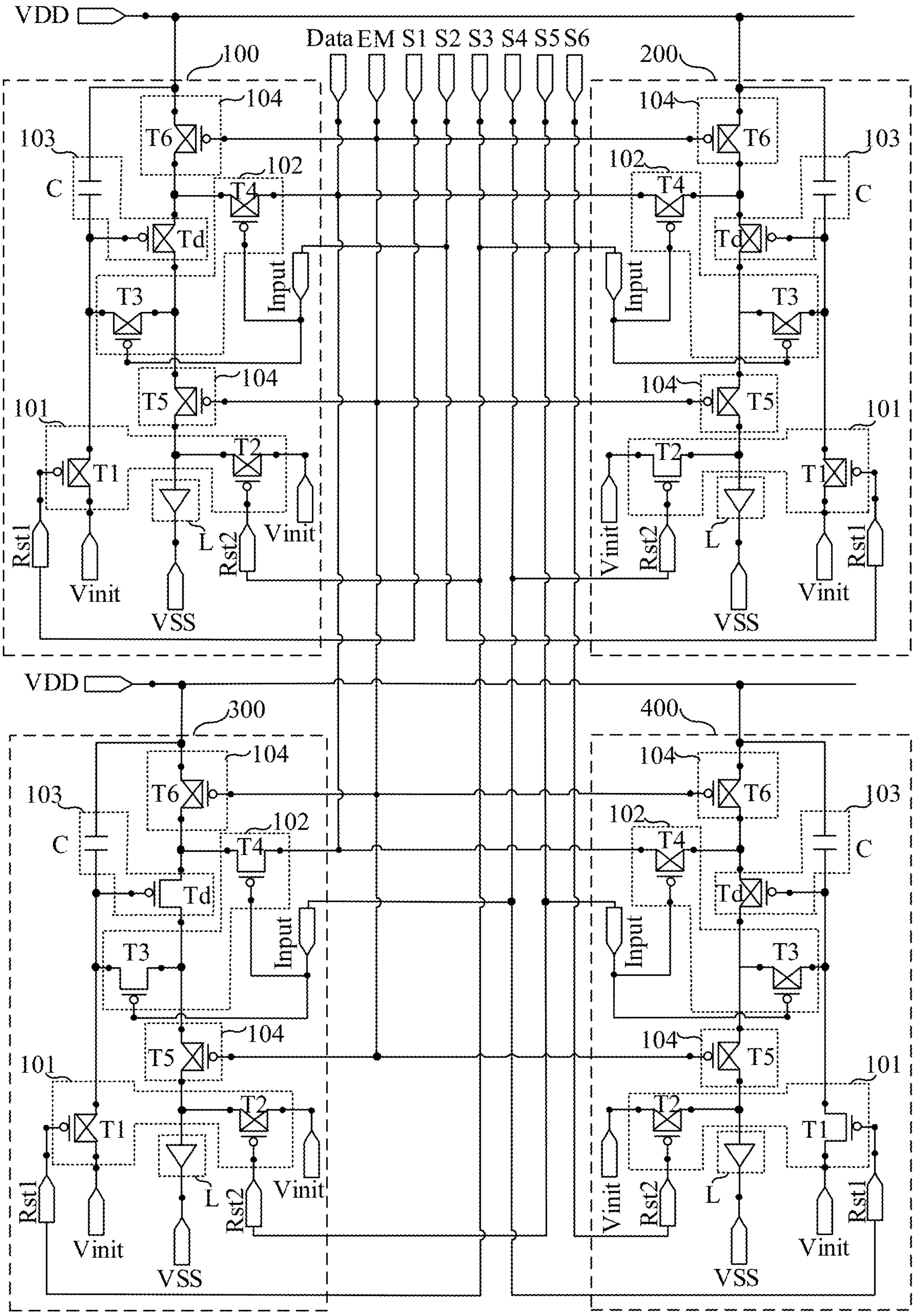

In the fourth scanning period P4, the fourth scanning signal terminal S4 outputs a low-level signal, the first scanning signal terminal S1, the second scanning signal terminal S2, the third scanning signal terminal S3, the fifth scanning signal terminal S5 and the sixth scanning signal terminal S6 all output high-level signals, and the enable terminal EM outputs the high-level signal. Based on this, an equivalent circuit diagram of the pixel circuit as shown in FIG. 5C is shown in FIG. 8D.

The second transistor T2 of the second sub-pixel circuit 200 is turned on, and the first transistor T1, the third transistor T3, the fourth transistor T4, the fifth transistor T5, and the sixth transistor T6 of the second sub-pixel circuit 200 are all turned off.

A capacitor of the second sub-pixel circuit 200 keeps the gate voltage of the driving transistor Td at (Vdata2+Vth), and the second transistor T2 of the first sub-pixel circuit 100 is turned on, so that the voltage provided by the initial voltage terminal Vinit is input to an anode of the light-emitting device L to force the black picture and improve the afterimage.

The third transistor T3 and the fourth transistor T4 of the third sub-pixel circuit 300 are turned on, and the driving transistor Td of the third sub-pixel circuit 300 is turned on, and the first transistor T1, the second transistor T2, the fifth transistor T5 and the sixth transistor T6 of the third sub-pixel circuit 300 are all turned off.

Since the third transistor T3 and the fourth transistor T4 of the third sub-pixel circuit 300 are turned on, the data signal (denoted as Vdata3) output by the data terminal Data is written into a first electrode of the driving transistor Td, so that Vgs of the driving transistor Td is equal to (V0−Vdata3) (Vgs=V0−Vdata3). In a case where V0 is −3 V, Vgs is less than 0 V, and the driving transistor Td is in an on state. In this case, a gate voltage of the driving transistor Td gradually increases until the gate voltage reaches (Vdata3+Vth), so as to achieve the threshold voltage compensation on the driving transistor. Therefore, Vgs of the driving transistor Td is equal to (Vdata3+Vth−Vdata3), i.e., equal to Vth (Vgs=Vdata3+Vth−Vdata3=Vth), so that the driving transistor Td is in an off state.

The first transistor T1 of the fourth sub-pixel circuit 400 is turned on, and the second transistor T2, the third transistor T3, the fourth transistor T4, the fifth transistor T5, the sixth transistor T6, and the driving transistor Td of the fourth sub-pixel circuit 400 are all turned off.

The first transistor T1 of the fourth sub-pixel circuit 400 is turned on, so that the voltage (denoted as V0) of the initial voltage terminal Vinit is input to a gate of the driving transistor Td to reset the gate of the driving transistor.

Figure 8E:
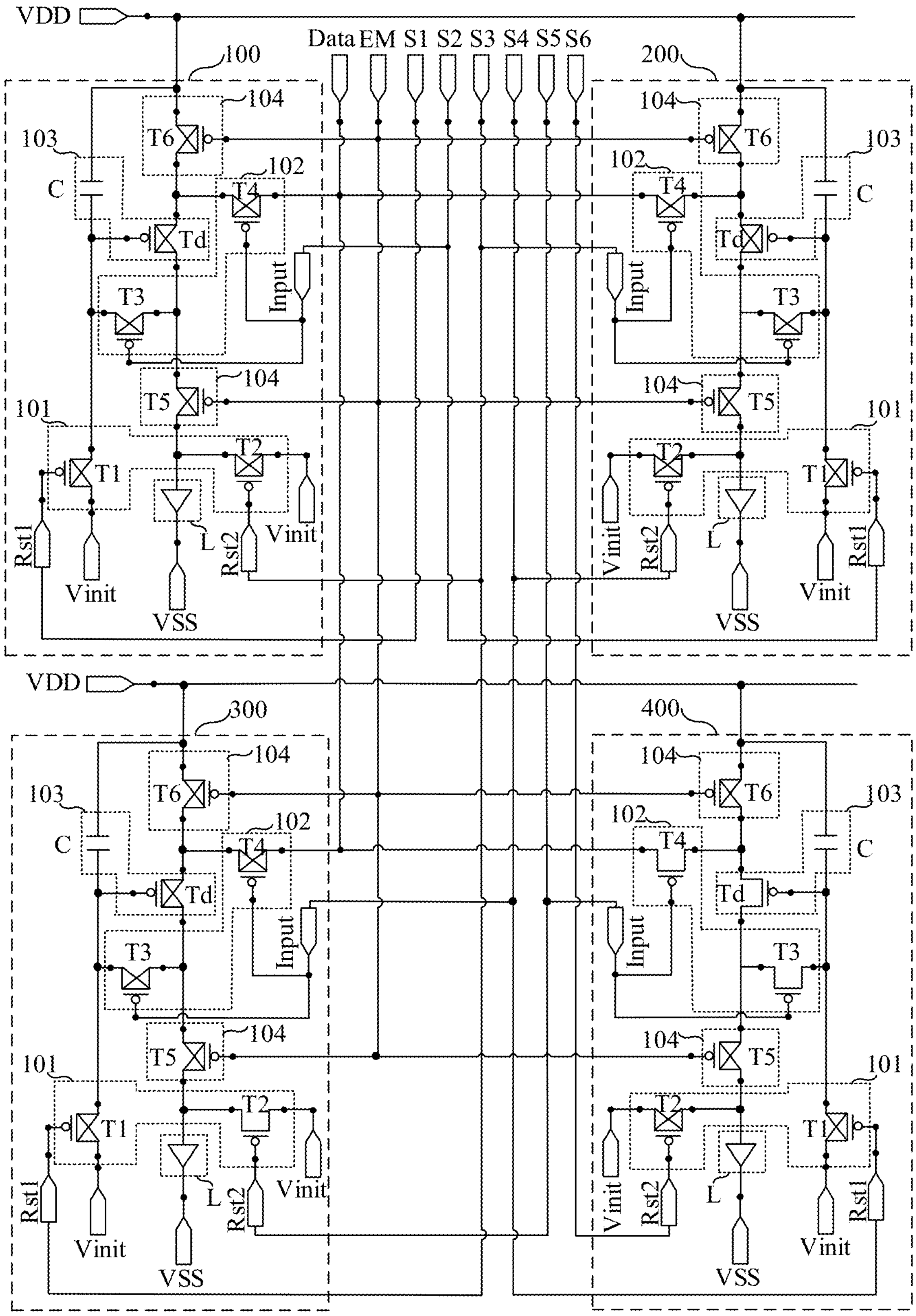

In the fifth scanning period P5, the fifth scanning signal terminal S5 outputs a low-level signal, the first scanning signal terminal S1, the second scanning signal terminal S2, the third scanning signal terminal S3, the fourth scanning signal terminal S4 and the sixth scanning signal terminal S6 all output high-level signals, and the enable terminal EM outputs the high-level signal. Based on this, an equivalent circuit diagram of the pixel circuit as shown in FIG. 5C is shown in FIG. 8E.

The second transistor T2 of the third sub-pixel circuit 300 is turned on, and the first transistor T1, the third transistor T3, the fourth transistor T4, the fifth transistor T5, and the sixth transistor T6 of the third sub-pixel circuit 300 are all turned off.

A capacitor of the third sub-pixel circuit 300 keeps the gate voltage of the driving transistor Td at (Vdata3+Vth), and the second transistor T2 of the third sub-pixel circuit 300 is turned on, so that the voltage provided by the initial voltage terminal Vinit is input to an anode of the light-emitting device L to force the black picture and improve the afterimage.

The third transistor T3 and the fourth transistor T4 of the fourth sub-pixel circuit 400 are turned on, and the driving transistor Td of the fourth sub-pixel circuit 400 is turned on, and the first transistor T1, the second transistor T2, the fifth transistor T5 and the sixth transistor T6 of the fourth sub-pixel circuit 400 are all turned off.

Since the third transistor T3 and the fourth transistor T4 of the fourth sub-pixel circuit 400 are turned on, the data signal (denoted as Vdata4) output by the data terminal Data is written into a first electrode of the driving transistor Td, so that Vgs of the driving transistor Td is equal to (V0–Vdata4) (Vgs=V0–Vdata4). In a case where V0 is –3 V, Vgs is less than 0 V, and the driving transistor Td is in an on state. In this case, a gate voltage of the driving transistor Td gradually increases until the gate voltage reaches (Vdata4+Vth), so as to achieve the threshold voltage compensation on the driving transistor. Therefore, Vgs of the driving transistor Td is equal to (Vdata4+Vth–Vdata4), i.e., equal to Vth (Vgs=Vdata4+Vth–Vdata4=Vth), so that the driving transistor Td is in an off state.

Figure 8F:
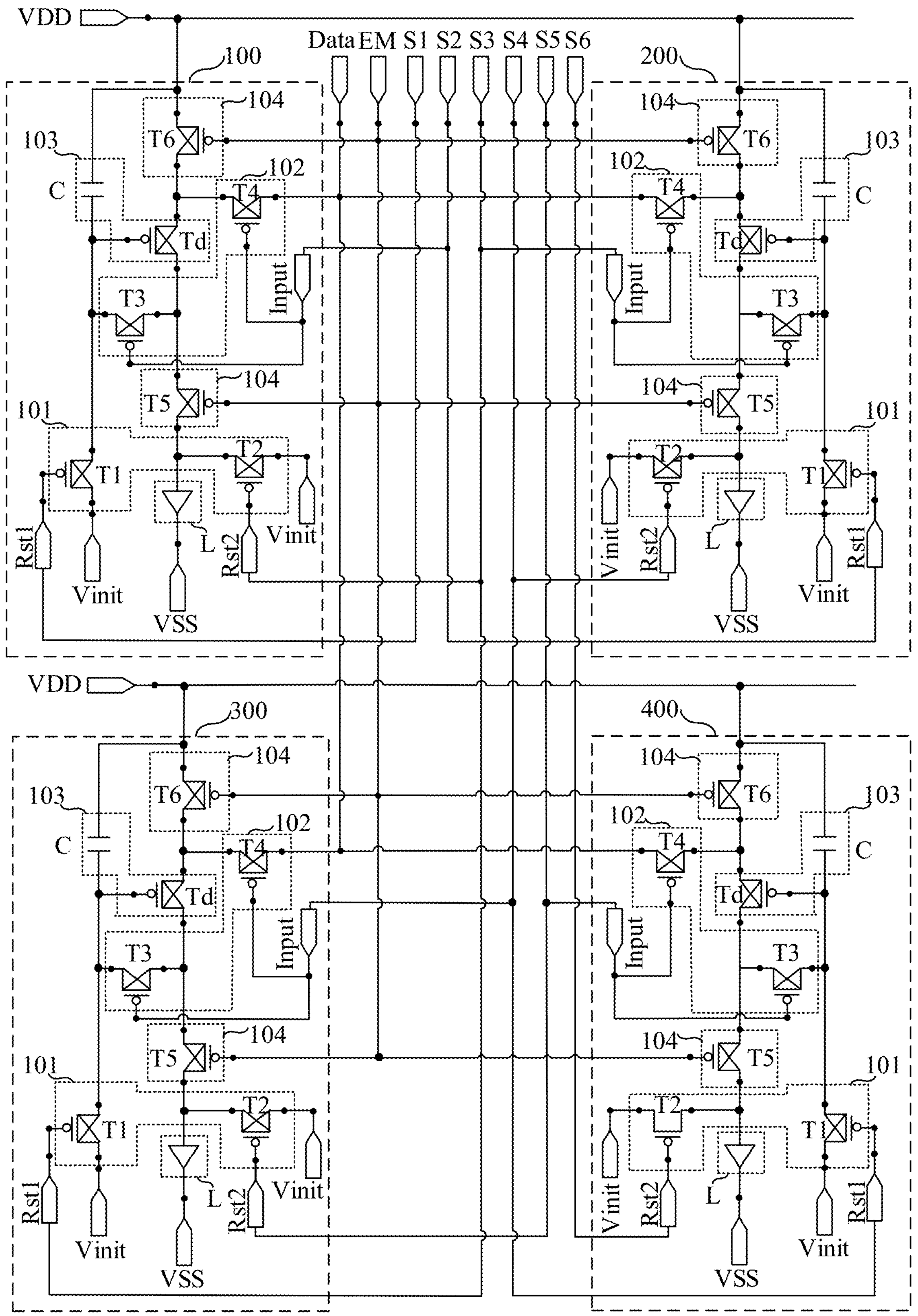

In the sixth scanning period P6, the sixth scanning signal terminal S6 outputs a low-level signal, the first scanning signal terminal S1, the second scanning signal terminal S2, the third scanning signal terminal S3, the fourth scanning signal terminal S4 and the fifth scanning signal terminal S5 all output high-level signals, and the enable terminal EM outputs the high-level signal. Based on this, an equivalent circuit diagram of the pixel circuit as shown in FIG. 5C is shown in FIG. 8F.

The second transistor T2 of the fourth sub-pixel circuit 400 is turned on, and the first transistor T1, the third transistor T3, the fourth transistor T4, the fifth transistor T5, and the sixth transistor T6 of the fourth sub-pixel circuit 400 are all turned off.

A capacitor of the fourth sub-pixel circuit 400 keeps the gate voltage of the driving transistor Td at (Vdata4+Vth), and the second transistor T2 of the first sub-pixel circuit 100 is turned on, so that the voltage provided by the initial voltage terminal Vinit is input to an anode of the light-emitting device L to force the black picture and improve the afterimage.

Figure 8G:
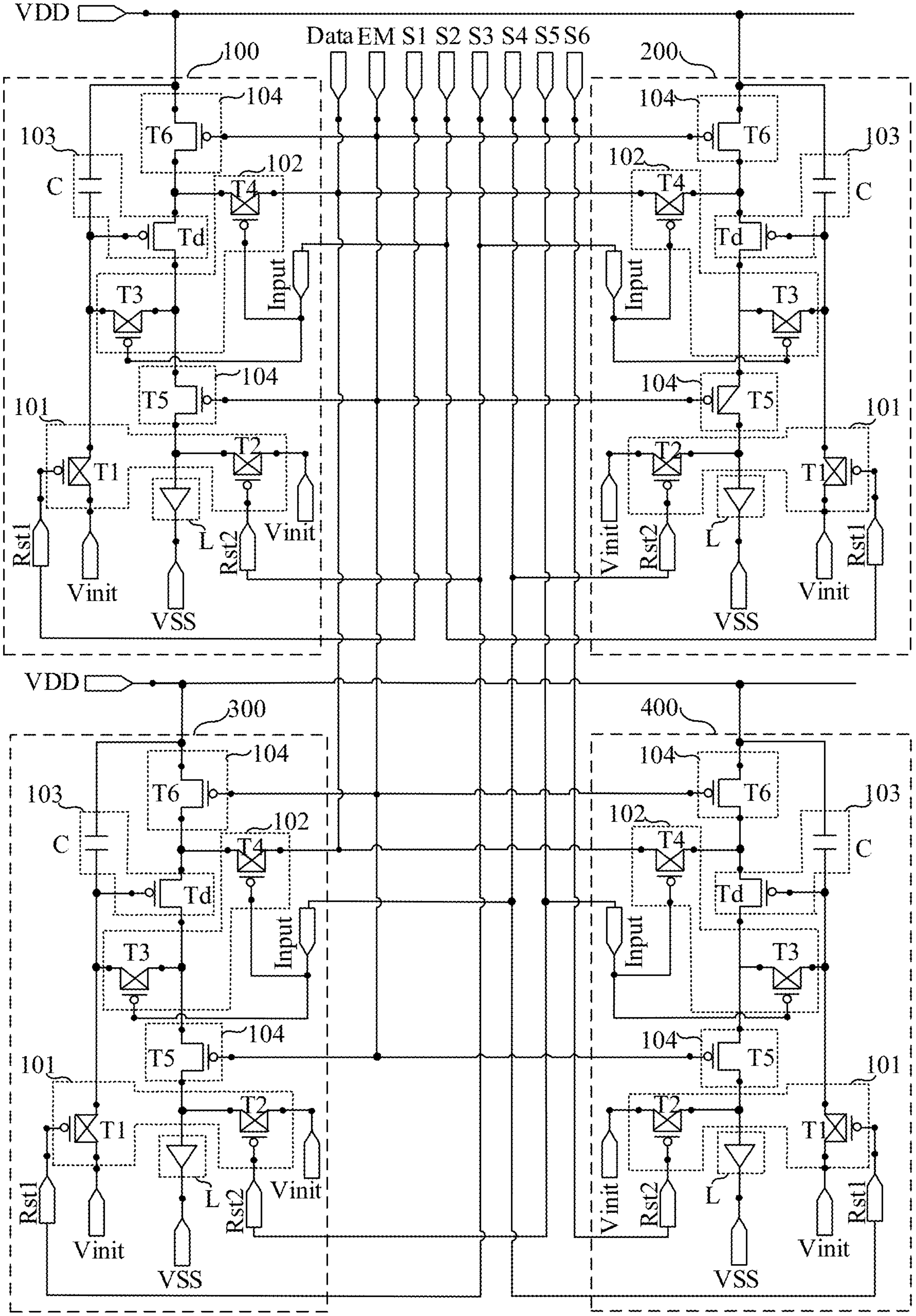

Based on the above, followed by analogy until the light-emitting phase, in the light-emitting phase, the first scanning signal terminal S1, the second scanning signal terminal S2, the third scanning signal terminal S3, the fourth scanning signal terminal S4, the fifth scanning signal terminal S5 and the sixth scanning signal terminal S6 all output high-level signals, and the enable terminal EM (E1) outputs a low-level signal. Based on this, an equivalent circuit diagram of the pixel circuit as shown in FIG. 5C is shown in FIG. 8G.

The fifth transistors T5 and the sixth transistors T6 of the first sub-pixel circuit 100, the second sub-pixel circuit 200, the third sub-pixel circuit 300, and the fourth sub-pixel circuit 400 are turned on, the first transistors T1 of the first sub-pixel circuit 100, the second sub-pixel circuit 200, the third sub-pixel circuit 300, and the fourth sub-pixel circuit 400 are turned on, and the second transistors T2, the third transistors T3, and the fourth transistors T4 of the first sub-pixel circuit 100, the second sub-pixel circuit 200, the third sub-pixel circuit 300, and the fourth sub-pixel circuit 400 are all turned off.

The first electrode of the driving transistor Td of the first sub-pixel circuit 100 and the first power supply voltage signal terminal VDD are connected, and the second electrode of the driving transistor Td of the first sub-pixel circuit 100 and the light-emitting device L are connected. On this basis, in a case where a difference between the gate voltage of the driving transistor Td and the power supply voltage signal Vdd provided by the first power supply voltage signal terminal VDD is less than the threshold voltage Vth thereof, the driving transistor Td is turned on. That is, in a case where ((Vdata1+Vth)–Vdd)<Vth, the driving current is capable of being transmitted into the light-emitting device L to drive the light-emitting device L to emit light.

The first electrode of the driving transistor Td of the second sub-pixel circuit 200 and the first power supply voltage signal terminal VDD are connected, and the second electrode of the driving transistor Td of the second sub-pixel circuit 200 and the light-emitting device L are connected. On this basis, in the case where the difference between the gate voltage of the driving transistor Td and the power supply voltage signal Vdd provided by the first power supply voltage signal terminal VDD is less than the threshold voltage Vth thereof, the driving transistor Td is turned on. That is, in a case where ((Vdata2+Vth)–Vdd)<Vth, the driving current is capable of being transmitted into the light-emitting device L to drive the light-emitting device L to emit light.

The first electrode of the driving transistor Td of the third sub-pixel circuit 300 and the first power supply voltage signal terminal VDD are connected, and the second electrode of the driving transistor Td of the third sub-pixel circuit 300 and the light-emitting device L are connected. On this basis, in the case where the difference between the gate voltage of the driving transistor Td and the power supply voltage signal Vdd provided by the first power supply voltage signal terminal VDD is less than the threshold voltage Vth thereof, the driving transistor Td is turned on. That is, in a case where ((Vdata3+Vth)–Vdd)<Vth, the driving current is capable of being transmitted into the light-emitting device L to drive the light-emitting device L to emit light.

The first electrode of the driving transistor Td of the fourth sub-pixel circuit 400 and the first power supply voltage signal terminal VDD are connected, and the second electrode of the driving transistor Td of the fourth sub-pixel circuit 400 and the light-emitting device L are connected. On this basis, in the case where the difference between the gate voltage of the driving transistor Td and the power supply voltage signal Vdd provided by the first power supply voltage signal terminal VDD is less than the threshold voltage Vth thereof, the driving transistor Td is turned on. That is, in a case where ((Vdata4+Vth)–Vdd)<Vth, the driving current is capable of being transmitted into the light-emitting device L to drive the light-emitting device L to emit light.

It will be understood by a person skilled in the art that the current for driving the light-emitting device L to emit light is I, $I=K*(V_G-V_s-V_{th})^2$, where $$K = \frac{1}{2} * \mu * Cox * \frac{W}{L},$$

μ is a mobility rate of electrons, Cox is a gate oxide capacitance per unit area, $$\frac{W}{L}$$

is a width to length ratio of the driving transistor Td, and Vth is the threshold voltage.

Followed by analogy, the current flowing through the driving transistor Td in each sub-pixel circuit is related only to the data voltage provided by the data terminal Data for achieving display and the first power supply voltage input by the first power supply voltage terminal VDD, and is not related to the threshold voltage Vth of the driving transistor Td, thereby eliminating the effect of the threshold voltage Vth of the driving transistor Td on the light-emitting brightness of the light-emitting device L.

Figure 9:
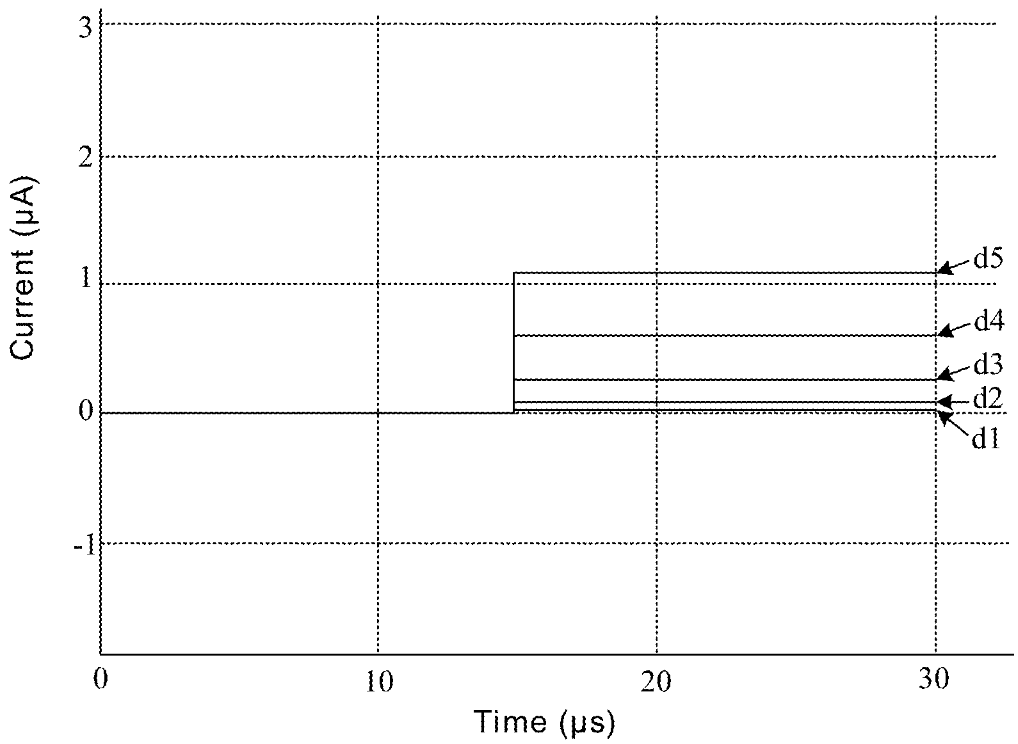
FIG. 9 is a schematic diagram showing a current of a light-emitting device.

On this basis, it may be understood that in a case where different sub-pixel circuits receive different signals of the data terminal, the included driving sub-circuits may output different currents, so that the brightness of each light-emitting device is different. As shown in FIG. 9, a data voltage of the data terminal received by a sub-pixel circuit corresponding to d1 is 4 V, a data voltage of the data terminal received by a sub-pixel circuit corresponding to d2 is 3.5 V, a data voltage of the data terminal received by a sub-pixel circuit corresponding to d3 is 3V, a data voltage of the data terminal received by a sub-pixel circuit corresponding to d4 is less than a data voltage of the data terminal received by a sub-pixel circuit corresponding to d3, and a data voltage of the data terminal received by a sub-pixel circuit corresponding to d5 is less than a data voltage of the data terminal received by a sub-pixel circuit corresponding to d4. It will be understood by a person skilled in the art that for an electroluminescent display panel, the smaller the Vdata voltage on the data line Data, the larger the current output to the light-emitting device L and the larger the brightness of the light emitted by the light-emitting device L.

In the above embodiments, all the transistors may be N-type transistors. Since the transistors are all N-type transistors, a corresponding scanning signal is required to be in a high-level state when the transistor is turned on.

It will be noted that a scanning direction is not limited in the embodiments. For example, the scanning direction may be row-by-row scanning from top to bottom. That is, sub-pixel circuits in a first row are scanned first, then sub-pixel circuits in a second row are scanned, and so on, until sub-pixel circuits in a last row are scanned. For another example, the scanning direction may be row-by-row scanning from bottom to top. That is, sub-pixel circuits in a last row are scanned first, then sub-pixel circuits in a previous row are scanned, and so on, until sub-pixel circuits in a first row are scanned.

Figure 10:
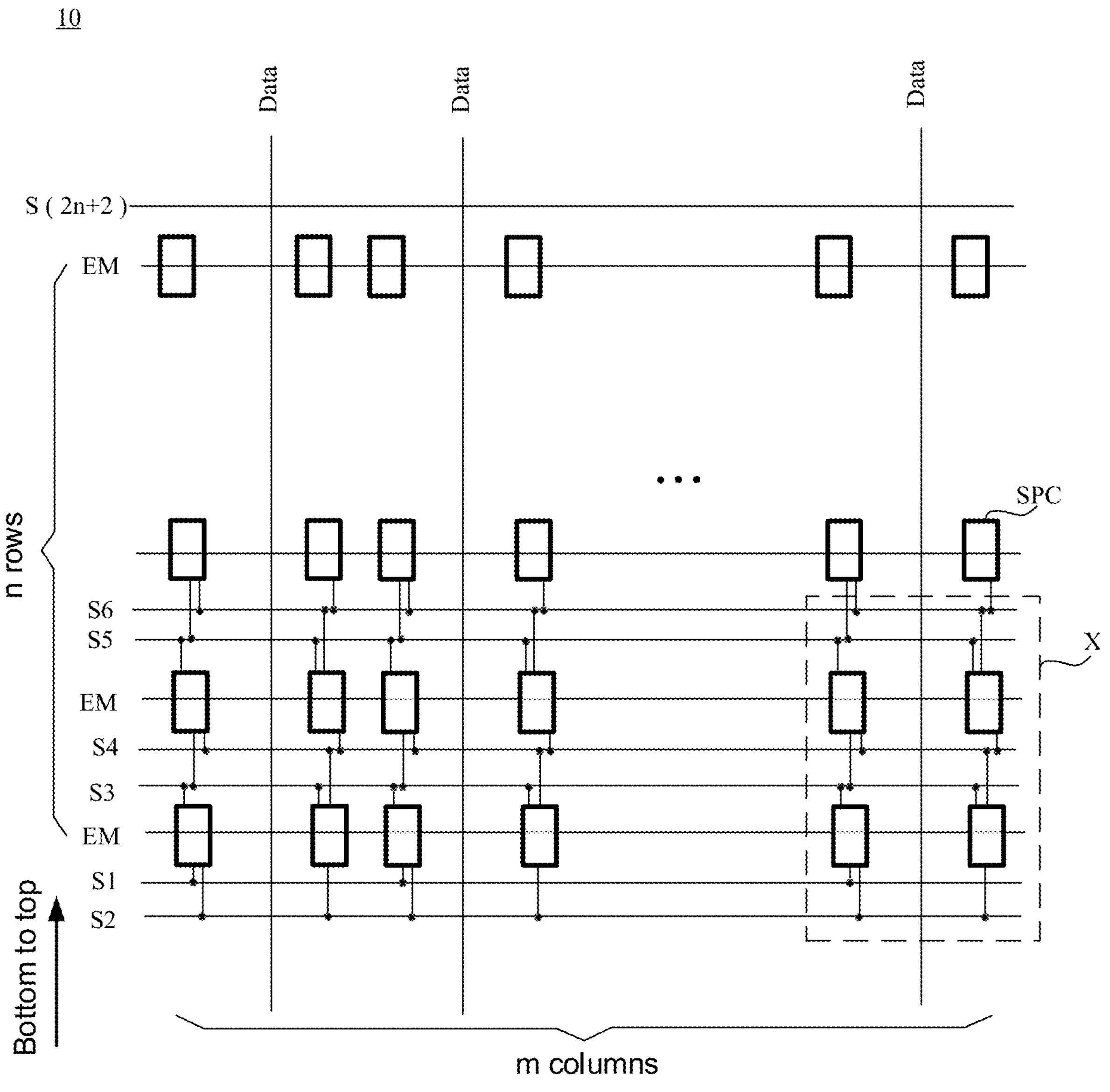
FIG. 10 is a block diagram showing a pixel circuit, in accordance with some embodiments of the present disclosure.

In some embodiments, as shown in FIG. 10, the pixel circuit includes n rows and m columns of sub-pixel circuits SPC, and the description is made by considering an example where the scanning direction is from bottom to top.

In a first scanning period, the first scanning signal terminal S1 outputs a low-level signal, so as to reset odd-numbered sub-pixel circuits in an n-th row (i.e., a last row, for example, a first row from bottom to top) of sub-pixel circuits. That is, in the first scanning period, the driving sub-circuits in the first sub-pixel circuit, the third sub-pixel circuit, the fifth sub-pixel circuit, etc. in the last row of sub-pixel circuits are reset.

In a second scanning period, the second scanning signal terminal S2 outputs a low-level signal, so as to compensate threshold voltages of driving sub-circuits of the odd-numbered sub-pixel circuits in the last row of sub-pixel circuits, and reset driving sub-circuits of even-numbered sub-pixel circuits in the last row of sub-pixel circuits. That is, in the second scanning period, the threshold voltages of the driving sub-circuits of the first sub-pixel circuit, the third sub-pixel circuit, the fifth sub-pixel circuit, etc. in the last row of sub-pixel circuits are compensated; and the driving sub-circuits of the second sub-pixel circuit, the fourth sub-pixel circuit, the sixth sub-pixel circuit, etc. in the last row of sub-pixel circuits are reset.

In a third scanning period, the third scanning signal terminal S3 outputs a low-level signal, and anodes of light-emitting devices of the odd-numbered sub-pixel circuits in the last row of sub-pixel circuits are reset; the threshold voltages of the driving sub-circuits of the even-numbered sub-pixel circuits in the last row of sub-pixel circuits are compensated; and driving sub-circuits of odd-numbered sub-pixel circuits in a second-to-last row (e.g., a second row from bottom to top) of sub-pixel circuits are reset.

In a fourth scanning period, the fourth scanning signal terminal S4 outputs a low-level signal, and anodes of light-emitting devices of even-numbered sub-pixel circuits in the last row of sub-pixel circuits are reset; the threshold voltages of the driving sub-circuits of the odd-numbered sub-pixel circuits in the second-to-last row of sub-pixel circuits are compensated; and driving sub-circuits of even-numbered sub-pixel circuits in the second-to-last row of sub-pixel circuits are reset.

In a fifth scanning period, the fifth scanning signal terminal S5 outputs a low-level signal, and anodes of light-emitting devices of odd-numbered sub-pixel circuits in the second-to-last row of sub-pixel circuits are reset; the threshold voltage of the driving sub-circuits of the even-numbered sub-pixel circuits in the second-to-last row of sub-pixel circuits are compensated; and driving sub-circuits of odd-numbered sub-pixel circuits in a third-to-last row (e.g., a third row from bottom to top) of sub-pixel circuits are reset.

In a sixth scanning period, the sixth scanning signal terminal S6 outputs a low-level signal, and anodes of light-emitting devices of even-numbered sub-pixel circuits in the second-to-last row of sub-pixel circuits are reset; the threshold voltage of the driving sub-circuits of the odd-numbered sub-pixel circuits in the third-to-last row of sub-pixel circuits are compensated; and driving sub-circuits of even-numbered sub-pixel circuits in the third-to-last row of sub-pixel circuits are reset.

In a seventh scanning period, the seventh scanning signal terminal S7 outputs a low-level signal, and anodes of light-emitting devices of odd-numbered sub-pixel circuits in the third-to-last row of sub-pixel circuits are reset; and the threshold voltage of the driving sub-circuits of the even-numbered sub-pixel circuits in the third-to-last row of sub-pixel circuits are compensated.

In the embodiments, in a case where the reset sub-circuit includes the first reset control terminal Rst1 and the second reset control terminal Rst2, since the first scanning signal terminal S1, the second scanning signal terminal S2, the third scanning signal terminal S3 and the fourth scanning signal terminal S4 control the operation of the sub-pixel circuits in the first row, the third scanning signal terminal S3, the fourth scanning signal terminal S4, the fifth scanning signal terminal S5 and the sixth scanning signal terminal S6 control the operation of sub-pixel circuits in the second row, and the fifth scanning signal terminal S5, the sixth scanning signal terminal S6, the seventh scanning signal terminal S7, and the eighth scanning signal terminal S8 control the operation of sub-pixel circuits in the third row, thus, in a case where the pixel circuit includes n rows of sub-pixel circuits, a total of (2n+2) scanning signal terminals are required.

Some embodiments of the present disclosure provide an array substrate 2, as shown in FIG. 2, including a substrate 3, the pixel circuit 10 and a plurality of data signal lines disposed on the substrate 3. Each of the plurality of data signal lines is connected to a data terminal, the data signal line is configured to provide the data signal to the data terminal, and every two adjacent columns of sub-pixel circuits share a single data signal line. The pixel circuit 10 includes a plurality of sub-pixel circuits.

In some embodiments, the array substrate 2 further includes: a plurality of first power supply voltage signal lines, and the plurality of data signal lines and the plurality of first power voltage signal lines are disposed in a same layer and in parallel.

The array substrate further includes: a plurality of scanning signal lines, a plurality of initial signal lines, and a plurality of enable signal lines. The plurality of scanning signal lines are disposed in a same layer; and the plurality of initial signal lines and the plurality of enable signal lines are disposed in a same layer.

It will be noted that, in a case where the pixel circuit includes the capacitor, the plurality of scanning signal lines and a first electrode of the capacitor of the pixel circuit are disposed in a same layer; and the plurality of initial signal lines, the plurality of enable signal lines and a second electrode of the capacitor are disposed in a same layer.

Figure 11:
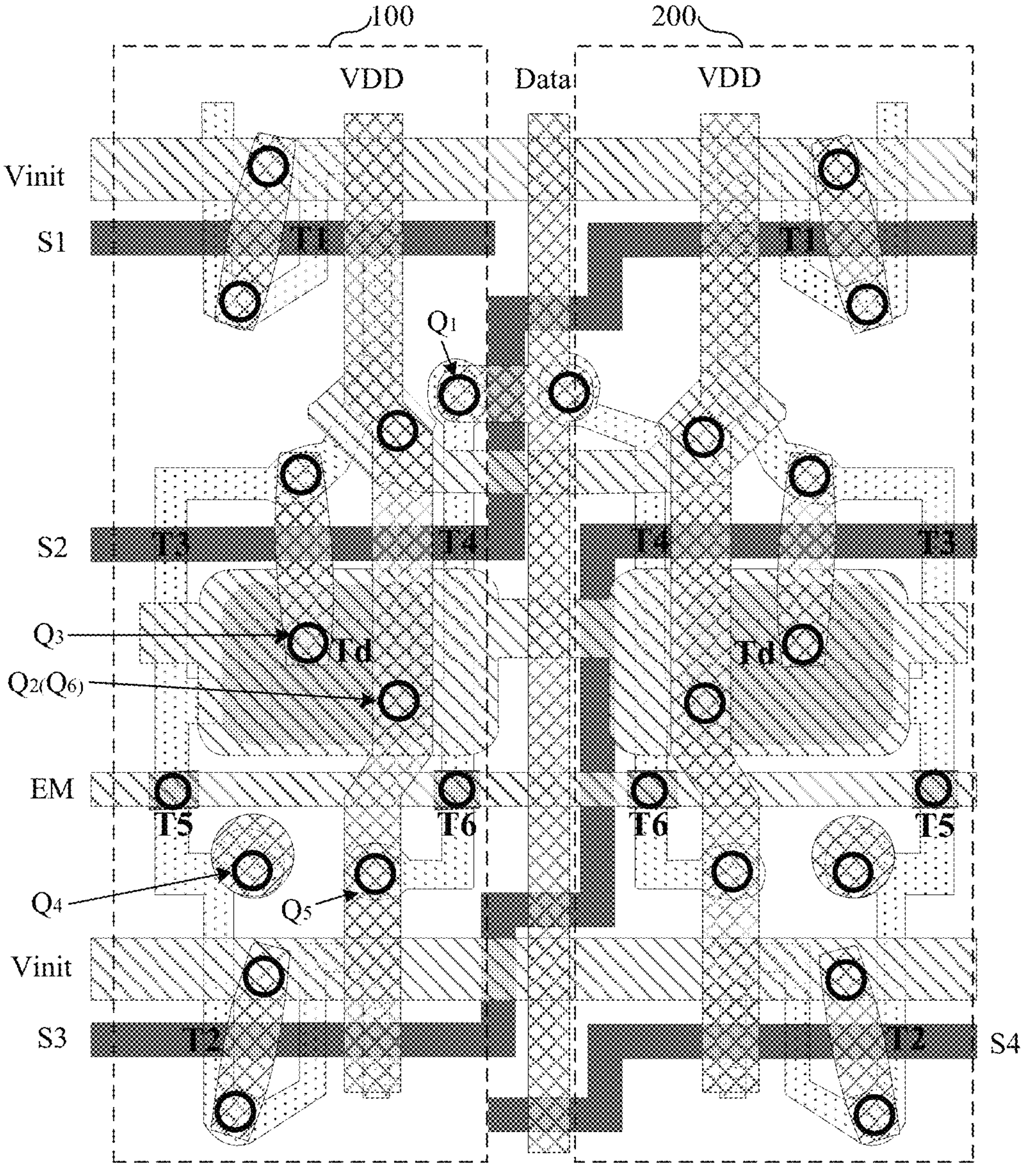
FIG. 11 is a diagram showing a structure of film layers of a pixel circuit, in accordance with some embodiments of the present disclosure.

Based on this, for example, as shown in FIG. 11, in the first sub-pixel circuit 100, the first transistor T1 includes a first active layer, a first insulating layer, a first gate, a first source, and a first drain. The first insulating layer is disposed between the first active layer and the first source and the first drain; the first gate is connected to a first scanning signal line S1; and the first source is electrically connected to an initial signal line Vinit, and the first drain is electrically connected to the third transistor T3.

The second transistor T2 includes a second active layer, a second insulating layer, a second gate, a second source and a second drain, and the second insulating layer is disposed between the second active layer and the second source and the second drain; the second gate is electrically connected to a third scanning signal line S3; and the second source is electrically connected to an initial signal line Vinit, and the second drain is electrically connected to the anode of the light-emitting device L.

The third transistor T3 includes a third active layer, a third insulating layer, a third gate, a third source and a third drain, and the third insulating layer is disposed between the third active layer and the third source and the third drain; and the third gate is electrically connected to a second scanning signal line S2, the third source is electrically connected to the gate of the driving transistor, and the third drain is electrically connected to the drain of the driving transistor.

The fourth transistor T4 includes a fourth active layer, a fourth insulating layer, a fourth gate, a fourth source and a fourth drain, and the fourth insulating layer is disposed between the fourth active layer and the fourth source and the fourth drain; the fourth source passes through a via hole Q1 in the fourth insulating layer and is electrically connected to the fourth active layer. The fourth drain passes through a via hole Q2 in the fourth insulating layer and is electrically connected to the fourth active layer; the fourth gate is electrically connected to the second scanning signal line S2; and the fourth source is electrically connected to a data line Data.

The fifth transistor T5 includes a fifth active layer, a fifth insulating layer, a fifth gate, a fifth source and a fifth drain, and the fifth insulating layer is disposed between the fifth active layer and the fifth source and the fifth drain; the fifth source passes through a via hole Q3 in the fifth insulating layer and is electrically connected to the fifth active layer, and the fifth drain passes through a via hole Q4 in the fifth insulating layer and is electrically connected to the fifth active layer; the fifth gate is electrically connected to an enable signal line EM; and the fifth source is electrically connected to the drain of the driving transistor, and the fifth drain is electrically connected to the anode of the light-emitting device L.

The sixth transistor T6 includes a sixth active layer, a sixth insulating layer, a sixth gate, a sixth source and a sixth drain, and the sixth insulating layer is disposed between the sixth active layer and the sixth source and the sixth drain; the sixth source passes through a via hole Q5 in the sixth insulating layer and is electrically connected to the sixth active layer, and the sixth drain passes through a via hole Q6 in the sixth insulating layer and is electrically connected to the sixth active layer; the sixth gate is electrically connected to the enable signal line EM; and the sixth source is electrically connected to a first power supply voltage signal line VDD, and the sixth drain is electrically connected to the fourth drain. Referring to FIG. 11, the fourth drain and the sixth drain are the same one in a case where the via hole Q2 and the via hole Q6 are the same one.

In the embodiments of the present disclosure, the first active layer, the second active layer, the third active layer, the fourth active layer, the fifth active layer and the sixth active layer are in a same layer and are made of a same material.

Followed by analogy, scanning signal lines connected to gates of the transistors of the other sub-pixel circuits are sequentially staggered by a single scanning signal line, and the other connection manners are similar to those described above and will not be repeated herein.

Figure 12:
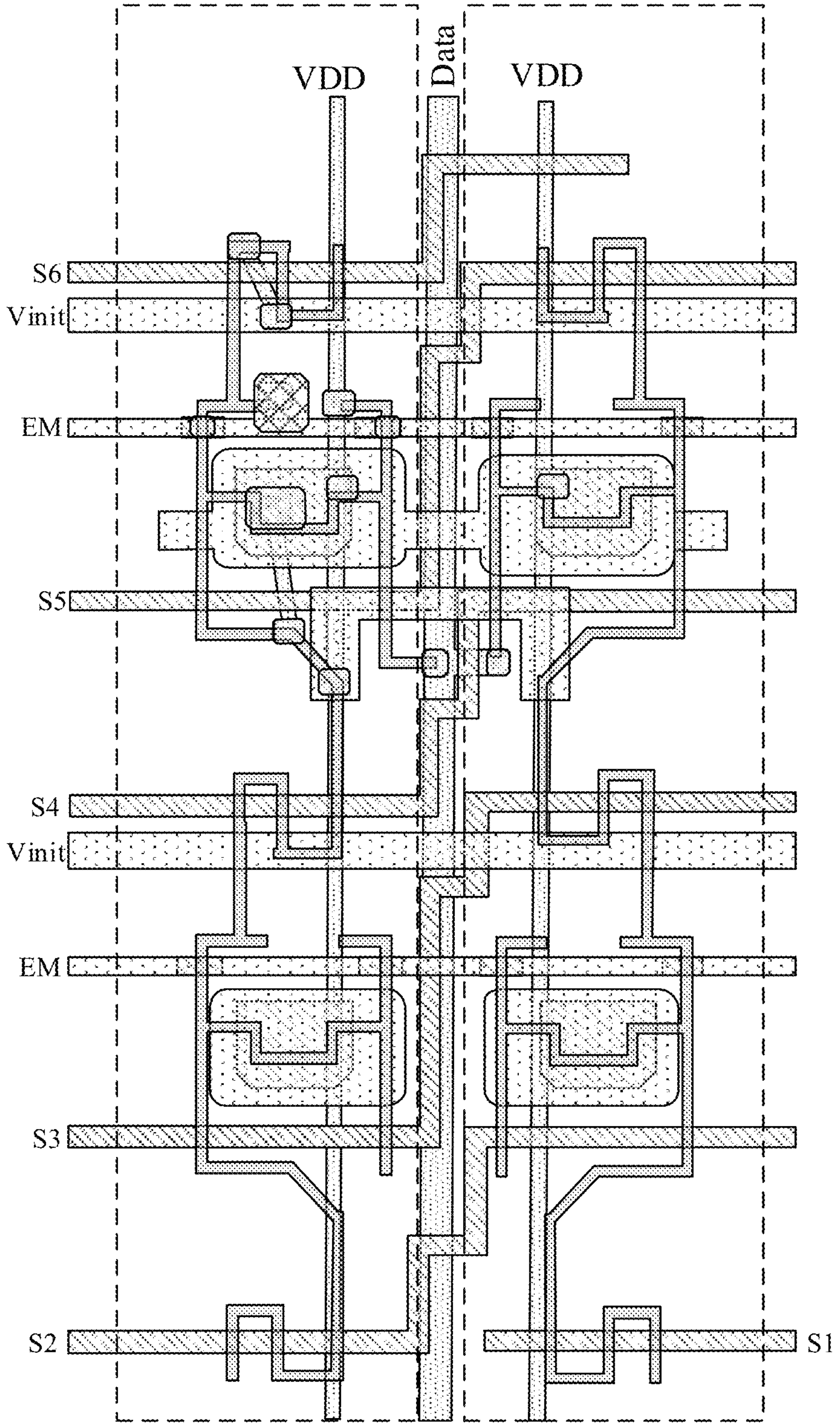
FIG. 12 is a diagram showing a structure of film layers of another pixel circuit, in accordance with some embodiments of the present disclosure.

In some embodiments, FIG. 12 is a diagram showing a film layer structure defined by the dashed frame X in FIG. 10. For the specific explanation of film layers, reference may be made to the above explanation of FIG. 11, which will not be repeated herein.

Figure 13:
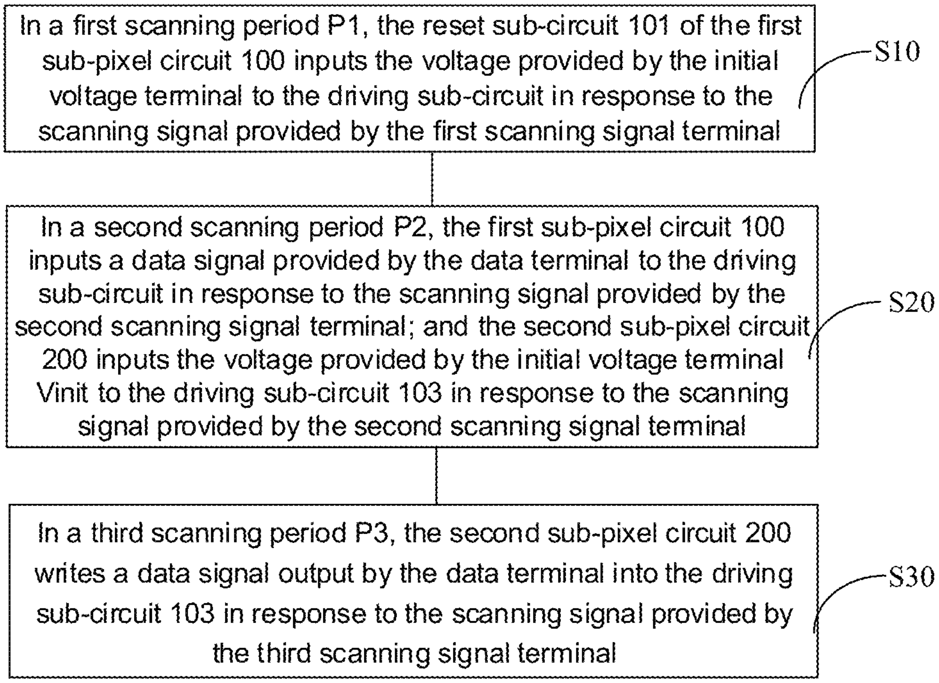
FIG. 13 is a flow diagram of a method for driving a pixel circuit, in accordance with some embodiments of the present disclosure.

The embodiments of the present disclosure further provide a method for driving the pixel circuit as described above. As shown in FIG. 13, the method includes S10 to S30.

In S10, in a first scanning period P1, the reset sub-circuit 101 of the first sub-pixel circuit 100 inputs a voltage provided by the initial voltage terminal to the driving sub-circuit in response to a scanning signal provided by the first scanning signal terminal.

In S20, in a second scanning period P2, the first sub-pixel circuit 100 inputs a data signal provided by the data terminal to the driving sub-circuit in response to a scanning signal provided by the second scanning signal terminal; and the second sub-pixel circuit 200 inputs the voltage provided by the initial voltage terminal Vinit to the driving sub-circuit 103 in response to the scanning signal provided by the second scanning signal terminal.

In S30, in a third scanning period P3, the second sub-pixel circuit 200 writes a data signal output by the data terminal into the driving sub-circuit 103 in response to a scanning signal provided by the third scanning signal terminal.

In some embodiments, in a case where the pixel circuit further includes a third sub-pixel circuit, after S30, the method for driving the pixel circuit further includes the following steps.

In the third scanning period P3, the third sub-pixel circuit 300 inputs the voltage provided by the initial voltage terminal Vinit to the driving sub-circuit 103 in response to the scanning signal provided by the third scanning signal terminal.

In the fourth scanning period P4, the third sub-pixel circuit 300 writes a data signal output by the data terminal into the driving sub-circuit 103 in response to a scanning signal output by a fourth scanning signal terminal to compensate for a threshold voltage of the driving sub-circuit 103.

In some embodiments, the driving method for the pixel circuit further includes the following steps.

In the third scanning period P3, the reset sub-circuit 101 of the first sub-pixel circuit inputs the voltage provided by the initial voltage terminal Vinit to the light-emitting device L in response to the scanning signal provided by the third scanning signal terminal.

In the fourth scanning period P4, the reset sub-circuit 101 of the second sub-pixel circuit 200 inputs the voltage provided by the initial voltage terminal Vinit to the light-emitting device L in response to the scanning signal provided by the fourth scanning signal terminal.

In the case where the pixel circuit further includes the third sub-pixel circuit 300 disposed in a third sub-pixel circuit, in a fifth scanning period P5, a reset sub-circuit 101 of the third sub-pixel circuit 300 inputs the voltage provided by the initial voltage terminal Vinit to the light-emitting device L in response to a scanning signal provided by a fifth scanning signal terminal.

In some embodiments, the method for driving the pixel circuit further includes in a light-emitting phase, a light-emitting control sub-circuit of the sub-pixel circuit closes a current path between a first power supply voltage terminal and a second power supply voltage terminal in response to an enable signal provided by an enable terminal, so that a driving current is transmitted to the light-emitting device.

It will be noted that in a case where the pixel circuit further includes a fourth sub-pixel circuit 400 disposed in a fourth sub-pixel, the methods for driving the second sub-pixel circuit 200, the third sub-pixel circuit 300 and the fourth sub-pixel circuit 400 are the same as the methods for driving the first sub-pixel circuit 100, the second sub-pixel circuit 200 and the third sub-pixel circuit 300. The method for driving the subsequent sub-pixel circuit, followed by analogy, will not be repeated herein.

In the embodiments of the present disclosure, for example, since two columns of sub-pixels share a single data line and every two rows of sub-pixels share a single enable signal line EM, the enable signal is controlled and output by a gate driver on array (GOA). In order to ensure that the every two rows of sub-pixels emit light normally simultaneously, generally, sub-pixels of a first row and a second row emit light after sub-pixels of a third row are written signals of the data terminal and when sub-pixels of a fourth row are written signals of the data terminal, and so on.

The method for driving the pixel circuit provided by the embodiments of the present disclosure has the same beneficial effects as those of the above described pixel circuits, which will not be repeated herein.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A pixel circuit, comprising a plurality of sub-pixel circuits, each sub-pixel circuit including a reset sub-circuit, a driving sub-circuit, and a light-emitting device;

the reset sub-circuit being electrically connected to a first reset control terminal, an initial voltage terminal and the driving sub-circuit, and the reset sub-circuit being configured to input a voltage provided by the initial voltage terminal to the driving sub-circuit under control of a signal from the first reset control terminal; and the driving sub-circuit being configured to control a driving current flowing through the light-emitting device according to a received data signal output by a data terminal; and the plurality of sub-pixel circuits including a first sub-pixel circuit and a second sub-pixel circuit; the first sub-pixel circuit and the second sub-pixel circuit being located in two adjacent columns, respectively, and the first sub-pixel circuit and the second sub-pixel circuit being connected to a same data terminal;

a first reset control terminal and a writing control terminal of the first sub-pixel circuit are connected to a first scanning signal terminal and a second scanning signal terminal, respectively;

a first reset control terminal and a writing control terminal of the second sub-pixel circuit are connected to the second scanning signal terminal and a third scanning signal terminal, respectively; and the first scanning signal terminal, the second scanning signal terminal and the third scanning signal terminal sequentially output scanning signals.

2. The pixel circuit according to claim 1, wherein the plurality of sub-pixel circuits further includes a third sub-pixel circuit; the third sub-pixel circuit and the first sub-pixel circuit are located in two adjacent rows, respectively, and the third sub-pixel circuit and the first sub-pixel circuit are located in a same column and connected to the same data terminal;

a first reset control terminal and a writing control terminal of the third sub-pixel circuit are connected to the third scanning signal terminal and a fourth scanning signal terminal, respectively.

3. The pixel circuit according to claim 2, wherein the plurality of sub-pixel circuits further includes a fourth sub-pixel circuit; the fourth sub-pixel circuit and the third sub-pixel circuit are located in a same row, and the fourth sub-pixel circuit and the second sub-pixel circuit are located in a same column and connected to the same data terminal;

a first reset control terminal and a writing control terminal of the fourth sub-pixel circuit are connected to the fourth scanning signal terminal and a fifth scanning signal terminal, respectively.

4. The pixel circuit according to claim 3, wherein the reset sub-circuit is electrically connected to a second reset control terminal and the light-emitting device;

the reset sub-circuit is further configured to input the voltage provided by the initial voltage terminal to the light-emitting device under control of a signal from the second reset control terminal;

a second reset control terminal of the first sub-pixel circuit is connected to the third scanning signal terminal;

a second reset control terminal of the second sub-pixel circuit is connected to a fourth scanning signal terminal;

a second reset control terminal of the third sub-pixel circuit is connected to a fifth scanning signal terminal; and a second reset control terminal of the fourth sub-pixel circuit is connected to a sixth scanning signal terminal.

5. The pixel circuit according to claim 2, wherein the reset sub-circuit is electrically connected to a second reset control terminal and the light-emitting device;

the reset sub-circuit is further configured to input the voltage provided by the initial voltage terminal to the light-emitting device under control of a signal from the second reset control terminal;

a second reset control terminal of the first sub-pixel circuit is connected to the third scanning signal terminal;

a second reset control terminal of the second sub-pixel circuit is connected to a fourth scanning signal terminal; and a second reset control terminal of the third sub-pixel circuit is connected to a fifth scanning signal terminal.

6. The pixel circuit according to claim 1, wherein the reset sub-circuit is electrically connected to a second reset control terminal and the light-emitting device;

the reset sub-circuit is further configured to input the voltage provided by the initial voltage terminal to the light-emitting device under control of a signal from the second reset control terminal;

a second reset control terminal of the first sub-pixel circuit is connected to the third scanning signal terminal; and a second reset control terminal of the second sub-pixel circuit is connected to a fourth scanning signal terminal.

7. The pixel circuit according to claim 1, wherein each sub-pixel circuit further includes a writing compensation sub-circuit;

the writing compensation sub-circuit is electrically connected to a writing control terminal, the data terminal and the driving sub-circuit; and the writing compensation sub-circuit is configured to write the data signal output by the data terminal into the driving sub-circuit under control of a signal from the writing control terminal, so as to compensate for a threshold voltage of the driving sub-circuit.

8. The pixel circuit according to claim 1, wherein the light-emitting device is further electrically connected to a second power supply voltage terminal; and each sub-pixel circuit further includes a light-emitting control sub-circuit;

the light-emitting control sub-circuit is electrically connected to an enable terminal, a first power supply voltage terminal, the driving sub-circuit and the light-emitting device; and the light-emitting control sub-circuit is configured to close a current path between the first power supply voltage terminal and the second power supply voltage terminal under control of a signal from the enable terminal, so that the driving current is transmitted to the light-emitting device.

9. The pixel circuit according to claim 1, wherein the light-emitting device is further electrically connected to a second power supply voltage terminal; and each sub-pixel circuit further includes a writing compensation sub-circuit and a light-emitting control sub-circuit;

the writing compensation sub-circuit is electrically connected to a writing control terminal, the data terminal and the driving sub-circuit; and the writing compensation sub-circuit is configured to write the data signal output by the data terminal into the driving sub-circuit under control of a signal from the writing control terminal, so as to compensate for a threshold voltage of the driving sub-circuit; and the light-emitting control sub-circuit is electrically connected to an enable terminal, a first power supply voltage terminal, the driving sub-circuit and the light-emitting device; and the light-emitting control sub-circuit is configured to close a current path between the first power supply voltage terminal and the second power supply voltage terminal under control of a signal from the enable terminal, so that the driving current is transmitted to the light-emitting device;

the driving sub-circuit includes a driving transistor;

a gate of the driving transistor is electrically connected to the reset sub-circuit, a first electrode of the driving transistor is electrically connected to the writing compensation sub-circuit, and a second electrode of the driving transistor is electrically connected to the light-emitting control sub-circuit.

10. The pixel circuit according to claim 9, wherein the driving sub-circuit further includes a capacitor;

a first end of the capacitor is electrically connected to the gate of the driving transistor, and a second end of the capacitor is electrically connected to the first power supply voltage terminal.

11. The pixel circuit according to claim 9, wherein the reset sub-circuit includes a first transistor and a second transistor;

a gate of the first transistor is electrically connected to the first reset control terminal, a first electrode of the first transistor is electrically connected to the initial voltage terminal, and a second electrode of the first transistor is electrically connected to the gate of the driving transistor; and a gate of the second transistor is electrically connected to a second reset control terminal, a first electrode of the second transistor is electrically connected to the initial voltage terminal, and a second electrode of the second transistor is electrically connected to the light-emitting device.

12. The pixel circuit according to claim 9, wherein the writing compensation sub-circuit includes a third transistor and a fourth transistor;

a gate of the third transistor is electrically connected to the writing control terminal, a first electrode of the third transistor is electrically connected to the gate of the driving transistor, and a second electrode of the third transistor is electrically connected to the second electrode of the driving transistor; and a gate of the fourth transistor is electrically connected to the writing control terminal, a first electrode of the fourth transistor is electrically connected to the data terminal, and a second electrode of the fourth transistor is electrically connected to the first electrode of the driving transistor.

13. The pixel circuit according to claim 9, wherein the light-emitting control sub-circuit includes a fifth transistor and a sixth transistor;

a gate of the fifth transistor is electrically connected to the enable terminal, a first electrode of the fifth transistor is electrically connected to the second electrode of the driving transistor, and a second electrode of the fifth transistor is electrically connected to the light-emitting device; and a gate of the sixth transistor is electrically connected to the enable terminal, a first electrode of the sixth transistor is electrically connected to the first power supply voltage terminal, and a second electrode of the sixth transistor is electrically connected to the first electrode of the driving transistor.

14. An array substrate, comprising a substrate, and the pixel circuit according to claim 1 and a plurality of data signal lines that are disposed on the substrate;

wherein in the plurality of data signal lines, each data signal line is connected to a data terminal, the data signal line is configured to provide a data signal to the data terminal; and every two adjacent columns of sub-pixel circuits share a data signal line of the plurality of data signal lines.

15. The array substrate according to claim 14, further comprising a plurality of first power supply voltage signal lines; wherein the plurality of data signal lines and the plurality of first power supply voltage signal lines are disposed in a same layer and arranged in parallel.

16. A display apparatus, comprising the array substrate according to claim 14.

17. A method for driving the pixel circuit according to claim 1, the method comprising:

in a first scanning period, inputting, by a reset sub-circuit of the first sub-pixel circuit, the voltage provided by the initial voltage terminal to a driving sub-circuit of the first sub-pixel circuit in response to a scanning signal provided by the first scanning signal terminal;

in a second scanning period, inputting, by the first sub-pixel circuit, a data signal provided by the same data terminal to the driving sub-circuit of the first sub-pixel circuit in response to a scanning signal provided by the second scanning signal terminal; and inputting, by the second sub-pixel circuit, the voltage provided by the initial voltage terminal to a driving sub-circuit of the second sub-pixel circuit in response to the scanning signal provided by the second scanning signal terminal; and in a third scanning period, inputting, by the second sub-pixel circuit, another data signal output by the same data terminal to the driving sub-circuit of the second sub-pixel circuit in response to a scanning signal provided by the third scanning signal terminal.

18. The method according to claim 17, wherein the pixel circuit further includes a third sub-pixel circuit; the method further comprises:

in the third scanning period, inputting, by the third sub-pixel circuit, the voltage provided by the initial voltage terminal to a driving sub-circuit of the third sub-pixel circuit in response to the scanning signal provided by the third scanning signal terminal; and in a fourth scanning period, inputting, by the third sub-pixel circuit, yet another data signal output from the same data terminal to the driving sub-circuit of the third sub-pixel circuit in response to a scanning signal output from a fourth scanning signal terminal.

19. The method according to claim 18, further comprising:

in the third scanning period, inputting, by the reset sub-circuit of the first sub-pixel circuit, the voltage provided by the initial voltage terminal to a light-emitting device of the first sub-pixel circuit in response to the scanning signal provided by the third scanning signal terminal;

in the fourth scanning period, inputting, by the reset sub-circuit of the second sub-pixel circuit, the voltage provided by the initial voltage terminal to a light-emitting device of the second sub-pixel circuit in response to a scanning signal provided by a fourth scanning signal terminal; and in a fifth scanning period, inputting, by a reset sub-circuit of the third sub-pixel circuit, the voltage provided by the initial voltage terminal to a light-emitting device of the third sub-pixel circuit in response to a scanning signal provided by a fifth scanning signal terminal.

20. The method according to claim 17, wherein the method for driving the pixel circuit further comprises:

in a light-emitting phase, closing, by a light-emitting control sub-circuit of each sub-pixel circuit, a current path between a first power supply voltage terminal and a second power supply voltage terminal in response to an enable signal provided by an enable terminal, so that a driving current is transmitted to the light-emitting device of the sub-pixel circuit.

* * * * *